United States Patent
Sun et al.

(10) Patent No.: US 9,608,678 B1
(45) Date of Patent: Mar. 28, 2017

(54) METHOD AND APPARATUS FOR MITIGATING INTERFERENCE BETWEEN WIRELESS LOCAL AREA NETWORK (WLAN) COMMUNICATIONS AND CELLULAR COMMUNICATIONS

(71) Applicant: Marvell International LTD., Hamilton (BM)

(72) Inventors: Yakun Sun, Sunnyvale, CA (US); Mingguang Xu, San Jose, CA (US); Hui-Ling Lou, Sunnyvale, CA (US); Hongyuan Zhang, Fremont, CA (US); Yan Zhang, Palo Alto, CA (US); Liwen Chu, San Ramon, CA (US); Jinjing Jiang, San Jose, CA (US)

(73) Assignee: Marvell International LTD., Hamilton (BM)

( * ) Notice: Subject to any disclaimer, the term of this patent is extended or adjusted under 35 U.S.C. 154(b) by 42 days.

(21) Appl. No.: 14/571,715

(22) Filed: Dec. 16, 2014

Related U.S. Application Data

(60) Provisional application No. 61/918,514, filed on Dec. 19, 2013, provisional application No. 61/919,530, filed on Dec. 20, 2013.

(51) Int. Cl.
| | | |
|---|---|---|
| *H04B 15/00* | (2006.01) | |
| *H04B 1/10* | (2006.01) | |
| *H04W 24/02* | (2009.01) | |

(52) U.S. Cl.
CPC .............. *H04B 1/10* (2013.01); *H04W 24/02* (2013.01)

(58) Field of Classification Search
CPC .. H04W 72/082; H04W 24/02; H04B 1/1027; H04B 15/00; H04B 1/10

USPC ....... 370/277, 476, 252, 329; 455/63.1, 429, 455/557, 278
See application file for complete search history.

(56) References Cited

U.S. PATENT DOCUMENTS

| | | | | |
|---|---|---|---|---|
| 8,363,578 | B1 * | 1/2013 | Ramamurthy | H04W 72/02 370/310 |
| 8,670,399 | B2 * | 3/2014 | Liu | H04L 5/001 370/329 |
| 8,737,405 | B2 * | 5/2014 | Liu | H04L 5/0037 370/395.21 |

(Continued)

OTHER PUBLICATIONS

"Specification of the Bluetooth System" Master Table of Contents & Compliance Requirments—Covered Core Package version: 4.0; Jun. 30, 2010; 2302 Pages.

(Continued)

*Primary Examiner* — Md Talukder

(57) ABSTRACT

A wireless device including a first receiver and a second receiver. The first receiver is configured to receive a first signal transmitted on a first network using a first communication standard, and generate, in response to a signal strength of the first signal being greater than or equal to a predetermined threshold, first information about the first signal based on a first portion of the first signal. The second receiver is configured to receive a second signal transmitted on a second network using a second communication standard, and suppress interference from the first signal based on the first information about the first signal. The first communication standard is different from the second communication standard. The first receiver and the second receiver are co-located in the wireless device.

48 Claims, 11 Drawing Sheets

(56) References Cited

U.S. PATENT DOCUMENTS

| | | | |
|---|---|---|---|
| 8,787,338 B2 | 7/2014 | Liu et al. | |
| 8,787,385 B2 | 7/2014 | Liu et al. | |
| 8,811,203 B1* | 8/2014 | Liu | H04W 24/02 370/252 |
| 2004/0264417 A1* | 12/2004 | Heikkila | H04B 1/7097 370/335 |
| 2005/0254600 A1* | 11/2005 | Chen | H04L 27/0012 375/324 |
| 2008/0192644 A1* | 8/2008 | Utsunomiya | H04B 7/2656 370/252 |
| 2009/0285240 A1* | 11/2009 | Zhang | H04J 13/0014 370/476 |
| 2012/0040620 A1* | 2/2012 | Fu | H04B 1/1027 455/63.1 |
| 2012/0307744 A1* | 12/2012 | Charbit | H04W 72/1205 370/329 |
| 2013/0163543 A1* | 6/2013 | Freda | H04W 72/0406 370/329 |
| 2014/0105046 A1* | 4/2014 | Tellado | H04W 24/08 370/252 |
| 2014/0169234 A1* | 6/2014 | Zhu | H04W 72/082 370/277 |
| 2015/0146656 A1* | 5/2015 | Sun | H04W 16/16 370/329 |
| 2015/0222410 A1* | 8/2015 | Belghoul | H04W 28/085 370/252 |
| 2016/0037544 A1* | 2/2016 | Wang | H04W 88/06 370/329 |

OTHER PUBLICATIONS

IEEE 802.11a Supplement to IEEE Standard for Information Technology—Telecommunications and information exchange between systems—Local and metropolitan area networks—Specific requirements—Part 11: Wireless LAN Medivam Access Control (MAC) and Phsycial Layer (PHY) specifications: High-speed Physical Layer in the 5 GHz Band; Sep. 1999; 91 Pages.

IEEE 802.11b; IEEE Standard for Intormation Technology—Telecommunications and information exchange between systems—Local and metropolitan area networks—Specific requirements; Part 11: Wireless LAN Medium Access Control (MAC) and Physical Layer (PHY) specifications; Amendment 2: Higher-speed Physical Layer (PHY) extension in the 2.4 GHz band—Corrigendum 1; Nov. 2001, 23 pages.

IEEE 802.16; IEEE Standard for Local and Metropolitan Area Networks; Part 16: Air Interface for Broadband Wireless Access Systems: IEEE Computer Society and the IEEE Microwave Theory and Techniques Society; 2009; 2082 Pages.

IEEE 802.16e IEEE Standard for Local and Metropolitan area networks; Part 16: Air Interface for Fixed and Mobile Broadband Wireless Access Systems, Amendment 2: Physical and Medium Access Control Layers for Combined Fixed and Mobile Operation in Licensed Bands and Corrigendum 1; Feb. 28, 2006; 864 pages.

IEEE 802.20-2008 "IEEE Standard for Local and metropolitan area networks: Part 20: Air Interface for Mobile Broadband Wireless Access Systems Supporting Vehicular Mobility—Physical and Media Access Control Layer Specification" IEEE Computer Society; Aug. 29, 2008; 1053 Pages.

IEEE P802.11ac-D2.0; Draft Standard for Information Technology—Telecommunications and information exchange between systems—Local and metropolitan area networks—Specific Requirements; Part 11: Wireless LAN Medium Access Control (MAC) and Physical Layer (PHY) Specifications; Amendment 4: Enhancements for Very Hgih Throughput for Operation in Bands below 6 GHz; Jan. 2012; 359 pages.

IEEE P802.11ad/ D5.0: Draft Standard for Information Technology—Telecommunications and Information Exchange Between Systems—Local and Metorpoiltan Area Netowrks—Specific Requirements—Part 11: Wireless LAN Medium Access Control (MAC) and Physical Layer (PHY) Specifications—Amendment 3: Enhancements for Very High Throughput in the 60 GHz Band; Sep. 2011; 601 pages.

IEEE P802.11g/ D8.2; Draft Supplement to Standard [for] Information Technology—Telecommunications and information exchange between systems—Local and metropolitan area networks—Specific requirements; Part 11: Wireless LAN Medium Access Control (MAC) and Physical Layer (PHY) specifications: Further Higher Data Rate Extensions in the 2.4 GHz Band; Apr. 2003; 69 pages.

IEEE P802.11n: TGn Sync Proposal Technical Specifications; Syed Aon Mujtaba; IEEE 802.11-04/0889r6; May 2005; 131 pages.

IEEE Std 802.11™—2012, IEEE Standard for Information technology—Telecommunications and information exchange between systemsLocal and metropolitan area networks—Specific requirements, Part 11: Wireless LAN Medium Access Control (MAC) and Physical Layer (PHY) Specifications, Mar. 29, 2012, 2793 Pages.

IEEEP802.11ah—Minyoung, Park;Wireless LANs Proposed Specification Framework for TGah; Mar. 12, 2012; 13 Pages.

"Technical White Paper: Long Term Evolution (LTE): A Technical Overview", Motorola, 15 pages (2007).

3GPP TR 36.816 V11.2.0, "3rd Generation Partnership Project; Technical Specification Group Radio Access Network; Evolved Universal Terrestrial Radio Access (E- UTRA); Study on Signaling and Procedure for Interference Avoidance for In-Device Coexistence (Release 11)", 44 pages (Dec. 2011).

3GPP TS 23.122 V9.5.0, "3rd Generation Partnership Project; Technical Specification Group Core Network and Terminals; Non-Access-Stratum (NAS) functions related to Mobile Station (MS) in idle mode (Release 9) ", 42 pages (Dec. 2010).

3GPP TS 23.203 V10.6.0, "3rd Generation Partnership Project; Technical Specification Group Services and System Aspects; Policy and Charging Control Architecture (Release 10)", 131 pages (Mar. 2012).

3GPP TS 24.301 V 9.5.0, "3rd Generation Partnership Project; Technical Specification Group Core Network and Terminals; Non-Access-Stratum (NAS) for Evolved Packet System (EPS); Stage 3 (Release 9)", 297 pages (Dec. 2010).

3GPP TS 36.211 V10.4.0, "3rd Generation Partnership Project; Technical Specification Group Radio Access Network; Evolved Universal Terrestrial Radio Access (E-UTRA); Physical Channels and Modulation (Release 10)", 101 pages (Dec. 2011).

3GPP TS 36.213 V10.4.0, 3rd Generation Partnership Project; Technical Specification Group Radio Access Network; Evolved Universal Terrestrial Radio Access (E-UTRA); Physical Layer Procedures (Release 10), 125 pages (Dec. 2011).

3GPP TS 36.213 V10.5.0, 3rd Generation Partnership Project; Technical Specification Group Radio Access Network; Evolved Universal Terrestrial Radio Access (E-UTRA); Physical Layer Procedures (Release 10), 125 pages (Mar. 2012).

3GPP TS 36.300 V11.1.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 194 pages (Mar. 2012).

3GPP TS 36.300 V8.12.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 149 pages (Mar. 2010).

3GPP TS 36.304 V9.5.0, "3rd Generation Partnership Project; Technical Specification Group Radio Access Network; Evolved Universal Terrestrial Radio Access (E-UTRA); User Equipment (UE) procedures in idle mode (Release 9)", 32 pages (Dec. 2010).

3GPP TS 36.331 V10.4.0, "3rd Generation Partnership Project; Technical Specification Group Radio Access Network; Evolved Universal Terrestrial Radio Access (E-UTRA); Radio Resource Control (RRC); Protocol Specification (Release 10)", 296 pages (Dec. 2011).

Cariou at al., "Multi-channel Transmissions," Doc. No. IEEE 802.11-09/1022r0, The Institute of Electrical and Electronics Engineers, Inc., pp. 1-13 (Sep. 2009).

(56) References Cited

OTHER PUBLICATIONS

Eastlake et al., "Trill: Fine-Grained Labeling," Internet-Draft, 21 pages (Dec. 8, 2011).
IEEE P802.11ac/D2.1 "Draft Standard for Information Technology—Telecommunications and information LAN Medium Access Control (MAC) and Physical Layer (PHY) specifications: Amendment 4: Enhancements for Very High Throughput for Operation in Bands below 6 GHz" 2012; 363 Pages.
IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-456 (Sep. 2013).
IEEE Std 802.15.3c/D07 (Amendment to IEEE Std 802.15.3-2003) "Draft Amendment to IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension," The Institute of Electrical and Electronics Engineers, Inc., pp. 1-201 (2009).
IEEE Std 802.16-2009 (Revision of IEEE Std. 802.16-2004), IEEE Standard for Local and metropolitan area networks: Part 16: Air Interface for Broadband Wireless Access Systems, The Institute of Electrical and Electronics Engineers, Inc., 2082 pages (May 29, 2009).
IEEE Std 802.16j (Amendment to IEEE Std 802.16-2009), "IEEE Standard for Local and metropolitan area networks: Part 16: Air Interface for Broadband Wireless Access Systems—Amendment 1: Multihop Relay Specification," The Institute of Electrical and Electronics Engineers, Inc., pp. 1-315 (Jun. 12, 2009).
IEEE Std 802.16TM-2012 (Revision of IEEE Std. 802.16-2009), IEEE Standard for Air Interface for Broadband Wireless Access Systems: Part 1—Beginning through Section 7, *The Institute of Electrical and Electronics Engineers, Inc.*, 2558 pages (Aug. 17, 2012).
International Search Report and Written Opinion in International Application No. PCT/US2014/067713, mailed Jun. 30, 2015.
Invitation to Pay Additional Fees and Partial International Search Report in International Application No. PCT/US2014/067713, mailed Apr. 23, 2015 (6 pages).
Liu, et al, "Accessing Channels in a Multi-Channel Communication System," U.S. Appl. No. 13/440,214, filed Apr. 5, 2012 (38 pages).
Liu, et al, "Methods and Apparatus for Clear Channel Assessment," U.S. Appl. No. 13/034,421, filed Feb. 24, 2011 (47 pages).
Liu, et al., "VHT BSS Channel Selection," Institute of Electrical and Electronics Engineers, Inc., doc. No. IEEE 802.11-11/1433r0, pp. 1-10 (Nov. 2011).
Noh, et al., "Channel Selection and Management for 11 ac," Doc. No. IEEE 802.11-10/0593r1, The Institute of Electrical and Electronics Engineers, Inc., pp. 1-21 (May 20, 2010).
Park, "IEEE 802.11ac: Dynamic Bandwidth Channel Access," 2011 IEEE Intl Conf. on Communications (ICC), pp. 1-5 (Jun. 2011).
Pedersen et al., "Carrier Aggregation for LTE-Advanced: Functionality and Performance Aspects," IEEE Communications Magazine, vol. 49, No. 6, pp. 89-95, (Jun. 1, 2011).
Redieteab, et al., "Cross-Layer Multichannel Aggregation for Future WLAN Systems," 2010 IEEE Intl Conf. on Communication Systems (ICCS), pp. 740-745 (Nov. 2010).
Specification of the Bluetooth System, Version 2.0: vol. 0, "Master Table of Contents & Compliance Requirements," pp. 1-74; vol. 1, "Architecture & Terminology Overview," pp. 1-92; vol. 2, "Core System Package [Controller Volume]," pp. 1-814; vol. 4, "Core system Package [Host Volume]," pp. 1-250, (Nov. 4, 2004).
Wannstrom, "Carrier Aggregation explained," pp. 1-6 (May 2012).
Yuan et al., "Carrier Aggregation for LTE-Advanced Mobile Communication Systems," IEEE Communications Magazine, pp. 88-93 (Feb. 2010).

\* cited by examiner

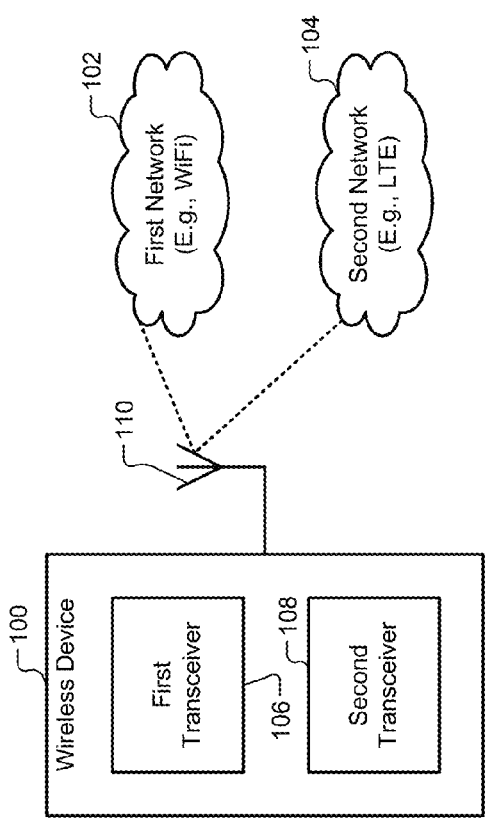
FIG. 1
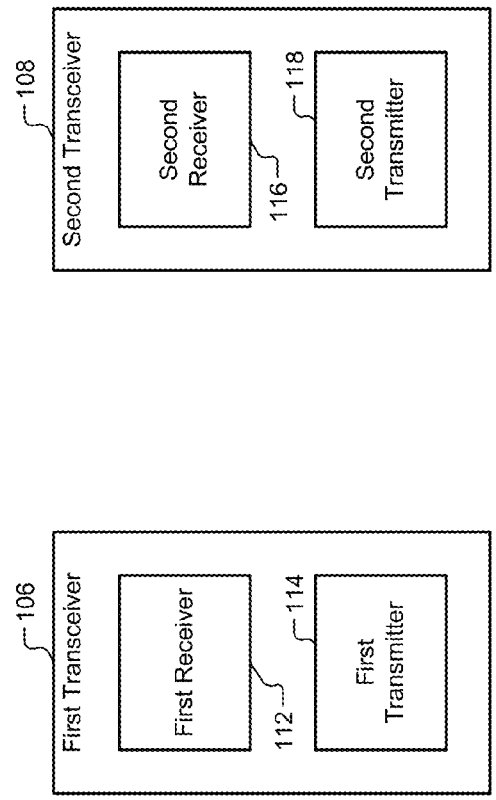
FIG. 2A
FIG. 2B

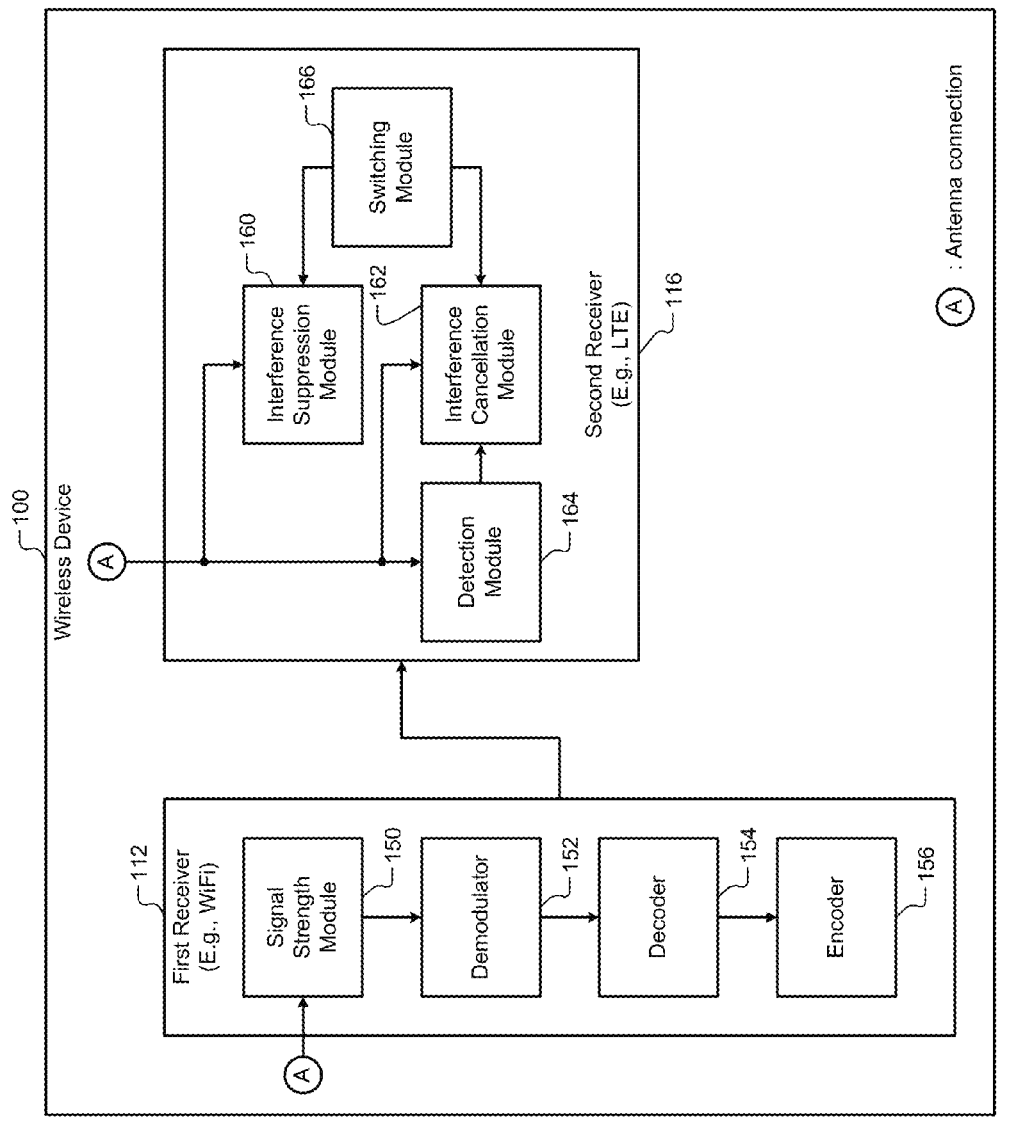
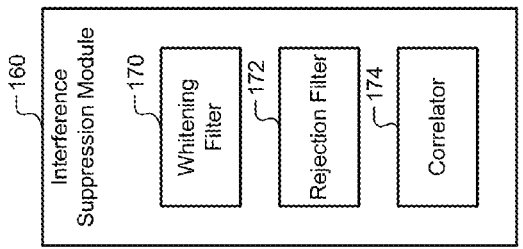

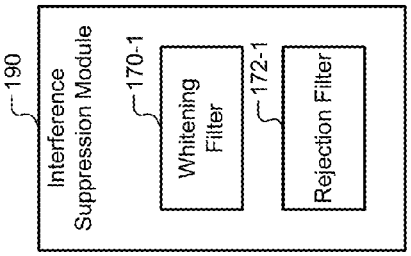
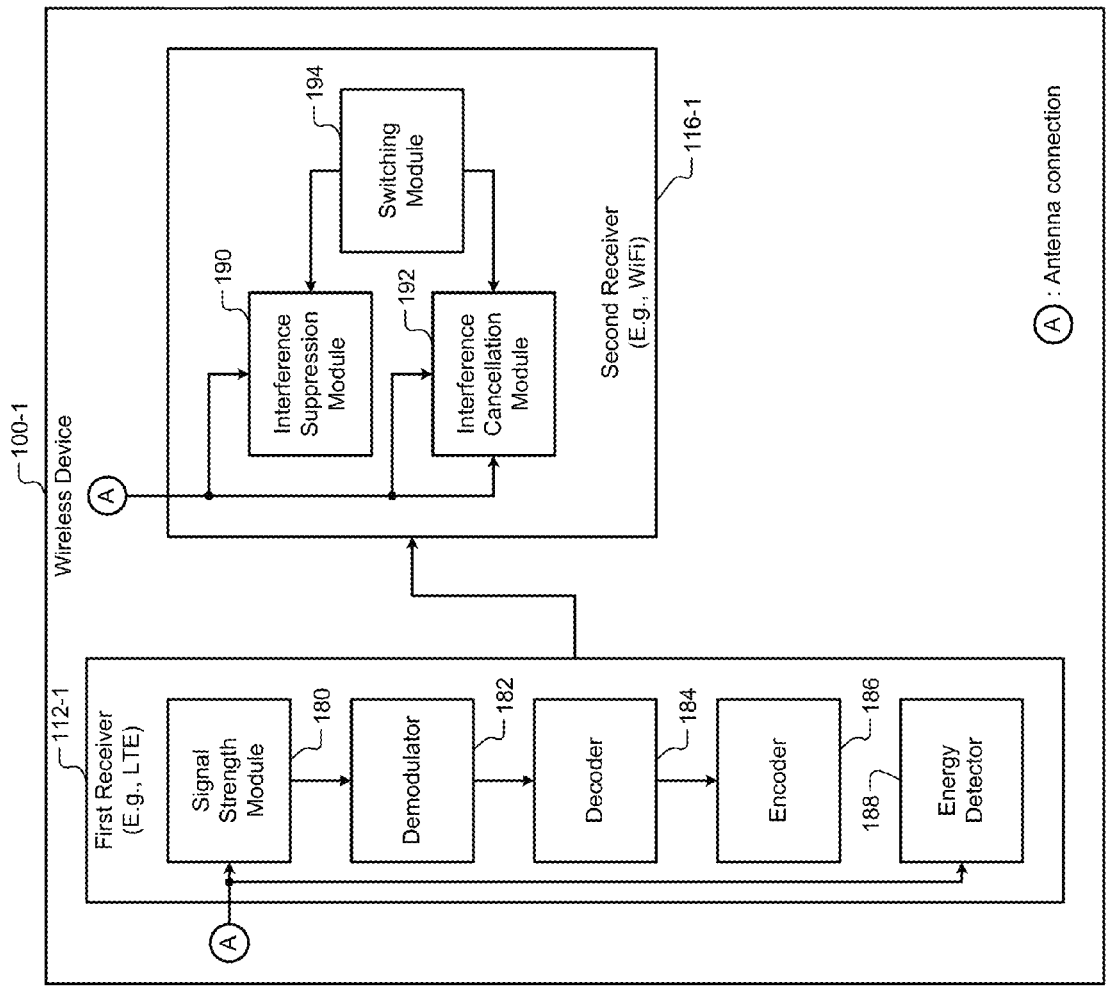

METHOD AND APPARATUS FOR MITIGATING INTERFERENCE BETWEEN WIRELESS LOCAL AREA NETWORK (WLAN) COMMUNICATIONS AND CELLULAR COMMUNICATIONS

CROSS-REFERENCE TO RELATED APPLICATIONS

The present disclosure claims the benefit of U.S. Provisional Application No. 61/918,514 filed on Dec. 19, 2013 and U.S. Provisional Application No. 61/919,530 filed on Dec. 20, 2013. The entire disclosures of the applications referenced above are incorporated herein by reference in their entirety.

FIELD

The present disclosure relates generally to wireless communication systems and more particularly to mitigating interference between disparate wireless networks coexisting in an unlicensed frequency band.

BACKGROUND

Wireless communication devices such as smartphones and tablets typically include one or more transceivers that provide wireless connectivity to one or more wireless networks, where each network uses a different communication standard. For example, a smartphone may include a cellular transceiver that connects the smartphone to a cellular network (e.g., a Long Term Evolution or LTE network) and a WiFi transceiver that connects the smartphone to a WiFi network (e.g., an IEEE 802.1x network). Additionally, the smartphone may include a Bluetooth transceiver that can connect the smartphone to another Bluetooth device. Each transceiver communicates in a frequency band specified by the respective communication standard.

Mobile wireless communication service providers operate using radio frequency (RF) spectrum allocated by and licensed by government regulatory agencies such as, in the United States, the Federal Communication Commission (FCC). For example, the FCC allocates/licenses the following bands (in units of mega Hertz (MHz)) for wide area wireless communication services: 698-894, 1710-1755, 1850-1910, 1930-1990, 2110-2155, and 2496-2690. Other frequency bands are allocated/licensed by government agencies for other uses such as broadcast television, broadcast frequency modulation (FM) radio, etc. To use any of these frequency bands, an operator must obtain a license from the appropriate government regulatory agency and agree to use the frequency bands for the designated purpose. Such frequency bands are referred to herein as "licensed frequency bands" or "licensed bands."

The $3^{rd}$ Generation Partnership Project (3GPP) defines standards for mobile telephone communication protocols for systems deployed in the licensed bands, such as the High-Speed Packet Access (HSPA) standard, the Evolved High-Speed Packet Access (HSPA+) standard, and the Long Term Evolution (LTE) standard. Similarly, the IEEE 802.16e Standard defines communication protocols for mobile telephone communication systems that are to be deployed in the licensed bands. HSPA+, LTE, and the IEEE 802.16e Standard are examples of wireless wide area network (WAN) communication protocols.

Other frequency bands are allocated by government agencies for use by the general public and do not require a license from the government (but the government typically places use restrictions such as a maximum transmission power). For example, wireless local area networks, such as those operating according to a communication protocol defined by the IEEE 802.11 Standard, generally operate in the following bands (in units of MHz): 2400-2500 and 5240-5825. Such frequency bands are referred to herein as "unlicensed frequency bands" or "unlicensed bands."

SUMMARY

A wireless device comprises a first receiver and a second receiver. The first receiver is configured to receive a first signal transmitted on a first network using a first communication standard, and generate, in response to a signal strength of the first signal being greater than or equal to a predetermined threshold, first information about the first signal based on a first portion of the first signal. The second receiver is configured to receive a second signal transmitted on a second network using a second communication standard, and suppress interference from the first signal based on the first information about the first signal. The first communication standard is different from the second communication standard. The first receiver and the second receiver are co-located in the wireless device.

In other features, the first communication standard includes a WiFi standard, and the second communication standard includes a cellular standard.

In other features, the first receiver and the second receiver are configured to communicate in an unlicensed frequency band. The first receiver includes a portion of a physical layer and a portion of a medium access control layer and is configured to process a preamble of the first signal including (i) the first portion of the first signal and (ii) a second portion of the first signal.

In other features, the first portion of the first signal includes a short training field and a long training field of the preamble of the first signal, and the second portion of the first signal includes a signal field of the preamble of the first signal.

In other features, the first receiver is configured to generate second information about the first signal based on the second portion of the first signal, and the second receiver is configured to cancel interference from the first signal based on the second information about the first signal.

In another feature, the second receiver is configured to dynamically switch between suppressing interference and cancelling interference depending on whether the first information or the second information is available.

In another feature, the second receiver is configured to detect, based on one or more of (i) the first information and (ii) the second information, a portion of the second signal that is interfered by the first signal; and suppress interference from the portion of the second signal using (i) a whitening filter or (ii) a rejection filter.

In another feature, the second receiver is configured to detect, based on one or more of (i) the first information and (ii) the second information, a portion of the second signal that is interfered by the first signal; and cancel interference from the portion of the second signal using feedback from the first receiver.

In other features, the first receiver is configured to decode the first signal, re-encode the first signal, and feedback the re-encoded first signal to the second receiver, and the second receiver is configured to cancel interference by subtracting the re-encoded first signal from the portion of the second signal that is interfered by the first signal.

In other features, the first receiver is configured to decode the first signal, generate soft information, generate an estimate of each symbol transmitted in the first signal, and feedback the estimate to the second receiver; and the second receiver is configured to cancel interference by subtracting the estimate from the portion of the second signal that is interfered by the first signal.

In another feature, the second receiver comprises a time-domain whitening filter configured to suppress interference from the first signal across a plurality of receive antennas.

In another feature, the second receiver comprises a correlator configured to suppress interference by correlating interference from the first signal across a plurality of receive antennas and tones.

In another feature, the second receiver comprises a frequency-domain whitening filter configured to suppress interference from the first signal using tone-by-tone whitening and by disregarding cross-tone interference.

In another feature, the second receiver comprises a frequency-domain whitening filter configured to suppress interference from the first signal using multiple-tone whitening. A number of tones whitened together is predetermined or adaptively selected.

In other features, the first communication standard includes a cellular standard, and the second communication standard includes a WiFi standard.

In other features, the first receiver and the second receiver are configured to communicate in an unlicensed frequency band. The first receiver includes a portion of a physical layer and a portion of a medium access control layer and is configured to process, without establishing a connection with a base station at a layer higher than the medium access control layer, (i) the first portion of the first signal and (ii) a second portion of the first signal. The first portion and the second portion of the first signal exclude a data portion of the first signal.

In other features, the first portion of the first signal includes information broadcast by the base station, and the second receiver is configured to suppress interference in response to the first receiver demodulating the first portion of the first signal including information broadcast by the base station.

In another feature, the second receiver is configured to suppress interference using (i) a whitening filter or (ii) a rejection filter.

In other features, the first portion of the first signal includes information broadcast by the base station, and the second receiver is configured to cancel interference in response to the first receiver decoding the first portion of the first signal including information broadcast by the base station.

In other features, the first receiver is configured to re-encode the first signal and feedback the re-encoded first signal to the second receiver, and the second receiver is configured to cancel interference by subtracting the re-encoded first signal from the second signal.

In other features, the second portion of the first signal includes information that is not addressed to the first receiver and that is un-decodable at the first receiver. The second receiver is configured to suppress interference based on the second portion of the first signal in response to the first receiver demodulating the second portion of the first signal including information (i) not addressed to the first receiver and (ii) un-decodable at the first receiver.

In other features, the second portion of the first signal includes information that is not addressed to the first receiver and that is decodable at the first receiver. The second receiver is configured to suppress or cancel interference based on the second portion of the first signal in response to the first receiver decoding the second portion of the first signal including information (i) not addressed to the first receiver and (ii) decodable at the first receiver.

In other features, the first receiver is configured to detect energy of the first signal and determine, based on the detected energy, whether data is transmitted in the first signal. The second receiver is configured to (i) suppress interference in response the first receiver determining that data is transmitted in the first signal and (ii) turn off interference suppression in response the first receiver determining that data is not transmitted in the first signal.

In other features, the first receiver is configured to decode the first signal in response (i) the first signal being not addressed to the first receiver and (ii) the first signal including information to assist the first receiver in decoding a data portion of the first signal. The second receiver is configured to cancel interference in response the first receiver decoding the data portion of the first signal.

In still other features, a method comprises receiving, at a first receiver, a first signal transmitted on a first network using a first communication standard; and generating, at the first receiver, in response to a signal strength of the first signal being greater than or equal to a predetermined threshold, first information about the first signal based on a first portion of the first signal. The method further comprises receiving, at a second receiver, a second signal transmitted on a second network using a second communication standard; and suppressing, at the second receiver, interference from the first signal based on the first information about the first signal. The first communication standard is different from the second communication standard. The first receiver and the second receiver are co-located in a wireless device.

In other features, the first communication standard includes a WiFi standard, and the second communication standard includes a cellular standard.

In other features, the method further comprises communicating, using the first receiver and the second receiver, in an unlicensed frequency band. The first receiver includes a portion of a physical layer and a portion of a medium access control layer. The method further comprises processing, using the portion of the physical layer and the portion of the medium access control layer of the first receiver, a preamble of the first signal including (i) the first portion of the first signal and (ii) a second portion of the first signal.

In other features, the first portion of the first signal includes a short training field and a long training field of the preamble of the first signal, and the second portion of the first signal includes a signal field of the preamble of the first signal.

In another feature, the method further comprises generating, at the first receiver, second information about the first signal based on the second portion of the first signal; and canceling, at the second receiver, interference from the first signal based on the second information about the first signal.

In another feature, the method further comprises dynamically switching, at the second receiver, between suppressing interference and cancelling interference depending on whether the first information or the second information is available.

In another feature, the method further comprises, at the second receiver, detecting, based on one or more of (i) the first information and (ii) the second information, a portion of the second signal that is interfered by the first signal; and suppressing interference from the portion of the second signal using (i) a whitening filter or (ii) a rejection filter.

In another feature, the method further comprises, at the second receiver, detecting, based on one or more of (i) the first information and (ii) the second information, a portion of the second signal that is interfered by the first signal; and canceling interference from the portion of the second signal using feedback from the first receiver.

In other features, the method further comprises, at the first receiver, decoding the first signal, re-encoding the first signal, and providing the re-encoded first signal to the second receiver; and at the second receiver, canceling interference by subtracting the re-encoded first signal from the portion of the second signal that is interfered by the first signal.

In other features, the method further comprises, at the first receiver, decoding the first signal, generating soft information, generating an estimate of each symbol transmitted in the first signal, and providing the estimate to the second receiver; and at the second receiver, canceling interference by subtracting the estimate from the portion of the second signal that is interfered by the first signal.

In another feature, the method further comprises, at the second receiver, suppressing interference from the first signal across a plurality of receive antennas using a time-domain whitening filter.

In another feature, the method further comprises, at the second receiver, suppressing interference by correlating interference from the first signal across a plurality of receive antennas and tones.

In another feature, the method further comprises, at the second receiver, suppressing interference from the first signal using tone-by-tone whitening and by disregarding cross-tone interference.

In another feature, the method further comprises, at the second receiver, suppressing interference from the first signal using multiple-tone whitening. A number of tones whitened together is predetermined or adaptively selected.

In other features, the first communication standard includes a cellular standard, and the second communication standard includes a WiFi standard.

In other features, the method further comprises communicating, using the first receiver and the second receiver, in an unlicensed frequency band. The first receiver includes a portion of a physical layer and a portion of a medium access control layer. The method further comprises processing, using the portion of the physical layer and the portion of the medium access control layer of the first receiver, without establishing a connection with a base station at a layer higher than the medium access control layer, (i) the first portion of the first signal and (ii) a second portion of the first signal. The first portion and the second portion of the first signal exclude a data portion of the first signal.

In other features, the first portion of the first signal includes information broadcast by the base station; and the method further comprises suppressing, at the second receiver, interference in response to the first receiver demodulating the first portion of the first signal including information broadcast by the base station.

In another feature, the method further comprises, at the second receiver, suppressing interference using (i) a whitening filter or (ii) a rejection filter.

In other features, the first portion of the first signal includes information broadcast by the base station; and the method further comprises canceling, at the second receiver, interference in response to the first receiver decoding the first portion of the first signal including information broadcast by the base station.

In other features, the method further comprises, at the first receiver, re-encoding the first signal and providing the re-encoded first signal to the second receiver; and at the second receiver, canceling interference by subtracting the re-encoded first signal from the second signal.

In other features, the second portion of the first signal includes information that is not addressed to the first receiver and that is un-decodable at the first receiver; and the method further comprises suppressing, the second receiver, interference based on the second portion of the first signal in response to the first receiver demodulating the second portion of the first signal including information (i) not addressed to the first receiver and (ii) un-decodable at the first receiver.

In other features, the second portion of the first signal includes information that is not addressed to the first receiver and that is decodable at the first receiver; and the method further comprises at the second receiver, suppressing or canceling interference based on the second portion of the first signal in response to the first receiver decoding the second portion of the first signal including information (i) not addressed to the first receiver and (ii) decodable at the first receiver.

In other features, the method further comprises detecting, at the first receiver, energy of the first signal and determine, based on the detected energy, whether data is transmitted in the first signal; and at the second receiver, (i) suppressing interference in response the first receiver determining that data is transmitted in the first signal, and (ii) turning off interference suppression in response the first receiver determining that data is not transmitted in the first signal.

In other features, the method further comprises decoding, at the first receiver, the first signal in response (i) the first signal being not addressed to the first receiver and (ii) the first signal including information to assist the first receiver in decoding a data portion of the first signal; and canceling, at the second receiver, interference in response the first receiver decoding the data portion of the first signal.

In still other features, a wireless device comprises a receiver and a transceiver. The receiver is configured to sense a portion of a first signal transmitted on a Long Term Evolution network over a frequency channel in an unlicensed frequency band; and generate, in response to a signal strength of the first signal being greater than or equal to a predetermined threshold, feedback information about the first signal based on sensing the portion of the first signal. The transceiver is configured to determine whether to defer access to the frequency channel in the unlicensed frequency band based on the feedback information generated by the receiver. The receiver and the transceiver are co-located in the wireless device.

In another feature, the receiver includes a portion of a physical layer and a portion of a medium access control layer and is configured to process the portion of the first signal without establishing a connection with a base station at a layer higher than the medium access control layer.

In another feature, the feedback information includes an energy level of the first signal in response to the receiver being unable to demodulate or decode the first signal; detection of the first signal as being a Long Term Evolution signal in response to the receiver being able to demodulate the portion of the first signal; or timing information of the first signal in response to the receiver being able to decode the portion of the first signal.

In another feature, the transceiver is configured to determine a duration for which to defer access to the frequency channel in the unlicensed frequency band based on the feedback information generated by the receiver.

In another feature, the feedback information includes transmission times and durations of portions of the first signal. The transceiver is configured to determine times and durations for which to defer access to the frequency channel in the unlicensed frequency band based on the feedback information; and schedule (i) transmission of a packet and (ii) reception of an acknowledgement over the frequency channel in the unlicensed frequency band between transmission times of two successive portions of the first signal.

In other features, the portion of the first signal includes a sub-frame of the first signal; the sub-frame of the first signal includes a control portion followed by a data portion; and the receiver is configured to decode the control portion and determine whether the data portion includes data. The transceiver is configured to defer access to the frequency channel for a duration of the control portion; defer access to the frequency channel for a duration of the data portion in response to the data portion including data; and schedule (i) transmission of a packet and (ii) reception of an acknowledgement in the duration of the data portion in response to the data portion including no data.

In other features, the portion of the first signal includes a sub-frame of the first signal, and the sub-frame of the first signal includes a control portion followed by a data portion. The receiver is configured to sense energy of the control portion and subsequently sense energy of the data portion. The transceiver is configured to defer access to the frequency channel for a duration of the control portion; defer access to the frequency channel for a duration of the data portion in response to the receiver sensing presence of data in the data portion; and schedule (i) transmission of a packet and (ii) reception of an acknowledgement in the duration of the data portion in response to the receiver sensing no data in the data portion.

In another feature, the transceiver is configured to access the frequency channel in the unlicensed frequency band based on the feedback information generated by the receiver, and transmit a second signal to a second device transmitting the first signal. The second signal includes a request to the second device to use another frequency channel in the unlicensed frequency band.

In another feature, the transceiver is configured to access the frequency channel in the unlicensed frequency band based on the feedback information generated by the receiver, and transmit a second signal to a second device transmitting the first signal. The second signal includes a characteristic of the first signal. The second signal causes the second device to use another frequency channel in the unlicensed frequency band.

In another feature, the transceiver is configured to access the frequency channel in the unlicensed frequency band based on the feedback information generated by the receiver, connect to a first network comprising a second device transmitting the first signal, and indicate to the first network that a second network comprising the wireless device (i) is similar to the first network and (ii) is operating in the frequency channel. The indication causes the second network to use another frequency channel in the unlicensed frequency band.

In another feature, the transceiver is configured to access the frequency channel in the unlicensed frequency band based on the feedback information generated by the receiver, connect to a base station of a first network comprising a second device transmitting the first signal, and negotiate time slots in the frequency channel in which to operate a second network comprising the wireless device.

In another feature, the transceiver broadcasts information about the negotiated time slots over the second network.

In another feature, the wireless device is configured to operate as a base station of the first network during the negotiation.

In another feature, the transceiver and the base station negotiate the time slots based on an inter-cell interference coordination procedure used by the base station in the first network.

In still other features, a method comprises sensing, at a receiver, a portion of a first signal transmitted on a Long Term Evolution network over a frequency channel in an unlicensed frequency band, and generating, at the receiver, in response to a signal strength of the first signal being greater than or equal to a predetermined threshold, feedback information about the first signal based on sensing the portion of the first signal. The method further comprises determining, at a transceiver, whether to defer access to the frequency channel in the unlicensed frequency band based on the feedback information generated by the receiver. The receiver and the transceiver are co-located in a wireless device.

In another feature, the receiver includes a portion of a physical layer and a portion of a medium access control layer; and the method further comprises processing, using the portion of the physical layer and the portion of the medium access control layer of the receiver, the portion of the first signal without establishing a connection with a base station at a layer higher than the medium access control layer.

In another feature, the feedback information includes an energy level of the first signal in response to the receiver being unable to demodulate or decode the first signal; detection of the first signal as being a Long Term Evolution signal in response to the receiver being able to demodulate the portion of the first signal; or timing information of the first signal in response to the receiver being able to decode the portion of the first signal.

In another feature, the method further comprises determining, at the transceiver, a duration for which to defer access to the frequency channel in the unlicensed frequency band based on the feedback information generated by the receiver.

In another feature, the feedback information includes transmission times and durations of portions of the first signal; and the method further comprises, at the transceiver, determining times and durations for which to defer access to the frequency channel in the unlicensed frequency band based on the feedback information; and scheduling (i) transmission of a packet and (ii) reception of an acknowledgement over the frequency channel in the unlicensed frequency band between transmission times of two successive portions of the first signal.

In another feature, the portion of the first signal includes a sub-frame of the first signal, and the sub-frame of the first signal includes a control portion followed by a data portion. The method further comprises decoding the control portion at the receiver; determining, at the receiver, whether the data portion includes data; deferring, at the transceiver, access to the frequency channel for a duration of the control portion; deferring, at the transceiver, access to the frequency channel for a duration of the data portion in response to the data portion including data; and scheduling, at the transceiver, (i) transmission of a packet and (ii) reception of an acknowledgement in the duration of the data portion in response to the data portion including no data.

In another feature, the portion of the first signal includes a sub-frame of the first signal, and the sub-frame of the first signal includes a control portion followed by a data portion. The method further comprises sensing, at the receiver, energy of the control portion and subsequently sense energy of the data portion; deferring, at the transceiver, access to the frequency channel for a duration of the control portion; deferring, the transceiver, access to the frequency channel for a duration of the data portion in response to the receiver sensing presence of data in the data portion; and scheduling, the transceiver, (i) transmission of a packet and (ii) reception of an acknowledgement in the duration of the data portion in response to the receiver sensing no data in the data portion.

In another feature, the method further comprises, at the transceiver, accessing the frequency channel in the unlicensed frequency band based on the feedback information generated by the receiver; and transmitting a second signal to a second device transmitting the first signal. The second signal includes a request to the second device to use another frequency channel in the unlicensed frequency band.

In another feature, the method further comprises, at the transceiver, accessing the frequency channel in the unlicensed frequency band based on the feedback information generated by the receiver; and transmitting a second signal to a second device transmitting the first signal. The second signal includes a characteristic of the first signal. The second signal causes the second device to use another frequency channel in the unlicensed frequency band.

In another feature, the method further comprises, at the transceiver, accessing the frequency channel in the unlicensed frequency band based on the feedback information generated by the receiver; connecting to a first network comprising a second device transmitting the first signal; and indicating to the first network that a second network comprising the wireless device (i) is similar to the first network and (ii) is operating in the frequency channel. The indication causes the second network to use another frequency channel in the unlicensed frequency band.

In another feature, the method further comprises, at the transceiver, accessing the frequency channel in the unlicensed frequency band based on the feedback information generated by the receiver; connecting to a base station of a first network comprising a second device transmitting the first signal; and negotiating time slots in the frequency channel in which to operate a second network comprising the wireless device.

In another feature, the method further comprises broadcasting from the transceiver information about the negotiated time slots over the second network.

In another feature, the method further comprises operating the wireless device as a base station of the first network during the negotiation.

In another feature, the method further comprises negotiating between the transceiver and the base station the time slots based on an inter-cell interference coordination procedure used by the base station in the first network.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

FIG. 1 is a functional block diagram of a wireless device configured to mitigate interference from a WiFi network to cellular communications performed by the wireless device with a cellular network in an unlicensed frequency band.

FIGS. 2A and 2B depict first and second transceivers of the wireless device of FIG. 1.

FIGS. 4A and 4B depict a detailed functional block diagram of the wireless device of FIG. 1.

FIGS. 5A and 5B depict a detailed functional block diagram of a wireless device configured to mitigate interference from a cellular network to WiFi communications performed by the wireless device with a WiFi network in an unlicensed frequency band.

In the drawings, reference numbers may be reused to identify similar and/or identical elements.

DESCRIPTION

Figure 3:
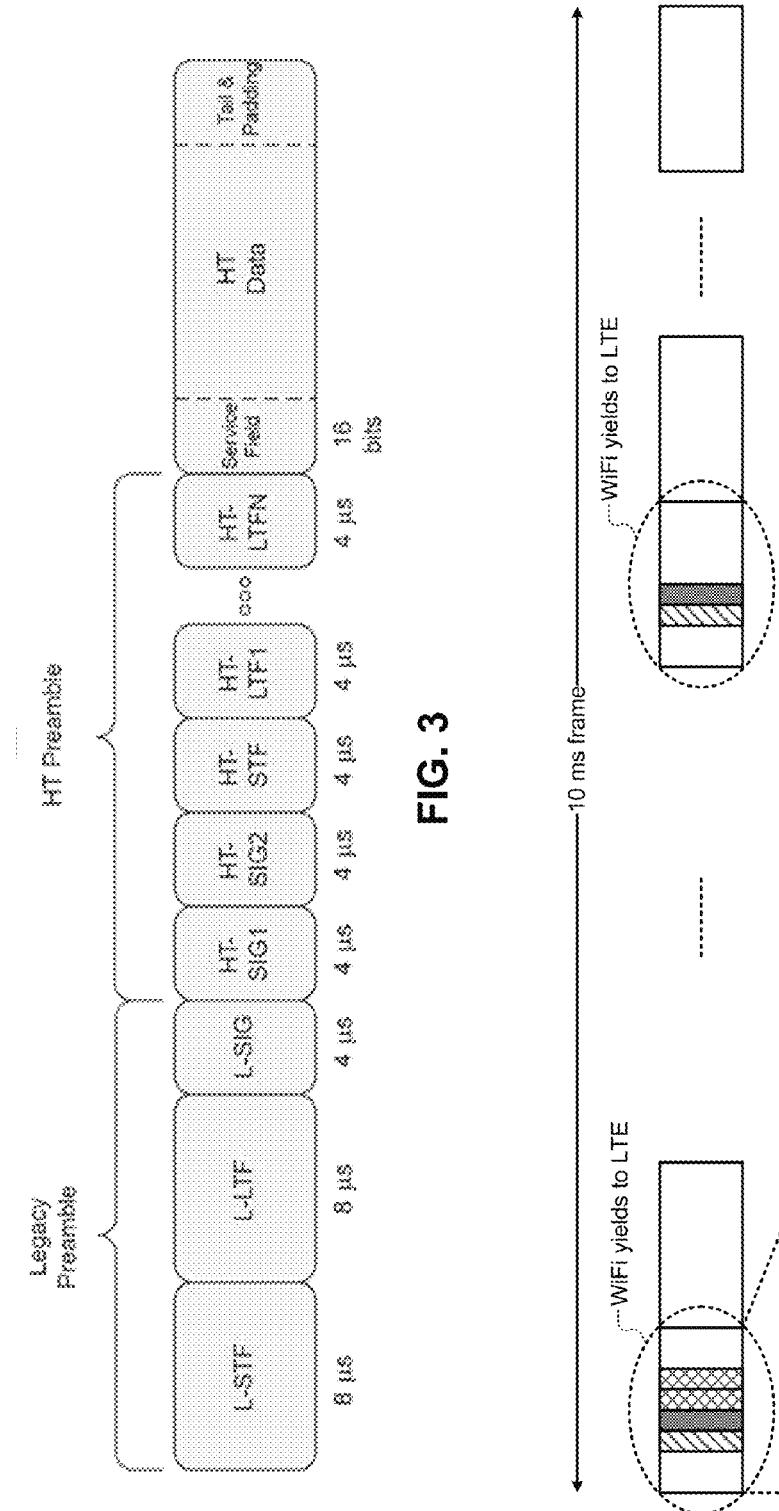
FIG. 3 depicts a WiFi frame (packet).

The present disclosure relates to mitigating interference between wireless networks that can occur when the wireless networks operate in an unlicensed frequency band. The interference can be mitigated in several ways. For example, the interference from one wireless network to another can be suppressed or canceled at a wireless device. Alternatively, the interference can be mitigated by deferring channel access (e.g., by yielding to the other wireless network or by causing the wireless other network to yield).

Recent trends in wireless communications include deploying cellular networks (e.g., an LTE network) in an unlicensed frequency band. WiFi networks can also operate in the unlicensed frequency band. WiFi and cellular networks can therefore coexist in the unlicensed frequency band. Coexistence of cellular and WiFi networks in the unlicensed frequency band can be challenging since the two technologies are different and since no standard currently exists to regulate communications of the two networks in the unlicensed frequency band.

Throughout the present disclosure, cellular and WiFi networks are used only as examples to illustrate interference mitigation between two networks. Further, an LTE network is used only as an example of a cellular network. The teachings of the present disclosure can be applied to mitigate interference between any two wireless networks. The teachings of the present disclosure can also be applied to mitigate interference between two same or similar wireless networks (e.g., between LTE and LTE, between one WiFi network and another WiFi network, and so on).

Two types of interference are described in the following examples: interference from a WiFi network to a cellular network (e.g., an LTE network), and interference from the cellular network (e.g., the LTE network) to the WiFi network. Two types of interference mitigation techniques are described below: interference suppression, which typically requires channel information of the network causing interference; and interference cancellation, which typically requires the channel information and decoding of interfering signals of the network causing interference. The two interference mitigation techniques can be dynamically selected (switched) based on available interference information and resources required to obtain the interference information.

FIG. 1 shows a wireless device 100 that communicates with a first network 102 and a second network 104. For example only, the first network 102 includes a WiFi network, and the second network 104 includes an LTE network. The wireless device 100 includes a first transceiver 106 that communicates with the first network 102 and a second transceiver 108 that communicates with the second network 104. The wireless device 100 communicates with the first network 102 and the second network 104 via one or more antennas 110. For example, the one or more antennas 110 may be arranged in a multiple-input multiple-output (MIMO) configuration.

FIG. 2A shows the first transceiver 106. The first transceiver 106 includes a first receiver 112 and a first transmitter 114. For example only, the first transceiver 106 includes a WiFi transceiver. For example only, the first receiver 112 includes a WiFi receiver, and the first transmitter 114 includes a WiFi transmitter.

FIG. 2B shows the second transceiver 108. The second transceiver 108 includes a second receiver 116 and a second transmitter 118. For example only, the second transceiver 108 includes an LTE transceiver. For example only, the second receiver 116 includes an LTE receiver, and the second transmitter 118 includes an LTE transmitter.

First, consider WiFi-to-LTE interference mitigation in an unlicensed frequency band (i.e., mitigating interference to an LTE network caused by a WiFi network when both networks coexist in an unlicensed frequency band). Suppose that the LTE receiver 116 is a victim of interference caused by unintended signals received from the WiFi network 102 in an unlicensed frequency band. That is, suppose that unintended WiFi signals transmitted over the WiFi network 102 interfere with desired LTE signals received by the LTE receiver 116 from the LTE network 104 in an unlicensed frequency band. The unintended WiFi signals can be demodulated and optionally decoded by the WiFi receiver 112 to generate information about the unintended WiFi signals. The LTE receiver 116 can use the information to mitigate the interference caused by the unintended WiFi signals to the desired LTE signals received by the LTE receiver 116.

For example, the WiFi receiver 112 may include a complete WiFi receiver capable of normally (i.e., fully) processing WiFi signals received from the WiFi network 102. For example, normal or full processing may include not only demodulating and decoding a WiFi packet but also decrypting the decoded WiFi packet. Alternatively, the WiFi receiver 112 may include a partial WiFi receiver capable of only demodulating and optionally decoding (i.e., partially processing) WiFi signals received from the WiFi network 102. For example, partial processing may include demodulating and optionally decoding a WiFi packet but may not also include decrypting the decoded WiFi packet.

For example, the WiFi receiver 112 may include only a portion of a physical (PHY) layer and a portion of a medium access control (MAC) layer that are capable of only demodulating and optionally decoding (i.e., partially processing) WiFi signals received from the WiFi network 102. For example, a complete WiFi receiver may include a PHY layer and upper and lower MAC layers capable of normally (i.e., fully) processing WiFi signals received from the WiFi network 102. A partial WiFi receiver, however, may include only portions of the PHY layer and the lower MAC layer that are capable of only demodulating and optionally decoding (i.e., partially processing) WiFi signals received from the WiFi network 102.

FIG. 3 shows an example of a WiFi frame (e.g., an IEEE 802.11n frame) comprising a Legacy preamble, a high throughput (HT) preamble, and a HT data portion. An IEEE802.11ac frame includes a very high throughput (VHT) preamble instead of the HT preamble and a VHT data portion instead of the HT data portion. The Legacy preamble includes a Legacy short training field (L-STF), a Legacy long training field (L-LTF), and a Legacy signal field (L-SIG). The HT preamble includes signals fields HT-SIG1 and HT-SIG2, a HT-STF field, and a plurality of HT-LTF fields HT-LTF1, . . . , and HT-LTFN, where N is an integer greater than 1.

FIGS. 4A and 4B show the wireless device 100 comprising the WiFi receiver 112 and the LTE receiver 116 in further detail. In FIG. 4A, the WiFi receiver 112 includes a signal strength module 150, a demodulator 152, a decoder 154, and an encoder 156. The decoder 154 and the encoder 156 can be optional and are used if interference cancellation rather than interference suppression is to be performed. The LTE receiver 116 includes an interference suppression module 160, an interference cancellation module 162, a detection module 164, and a switching module 166. The interference cancellation module 162 can be optional and is used if interference cancellation is to be performed (i.e., if the WiFi receiver 112 includes the decoder 154 and the encoder 156, which provide information for interference cancellation). The WiFi receiver 112 can detect relevant WiFi information by demodulating and optionally decoding preambles detected in WiFi signals received by the wireless device 100. Preamble detection can also provide a version of WiFi signals (IEEE 802.11a/b/g/n/ac, etc.) received by the wireless device 100.

The signal strength module 150 measures the signal strength of the WiFi signal received by the wireless device 100. If the signal strength of the WiFi signal is less than the predetermined threshold, the wireless device 100 does not perform interference mitigation. If the signal strength of the WiFi signal is greater than or equal to a predetermined threshold, the wireless device 100 performs interference mitigation as follows.

When the signal strength of the WiFi signal is greater than or equal to the predetermined threshold, the demodulator 152 can demodulate the STF/LTF fields used for synchronization and channel estimation. When used, the decoder module 154 decodes SIG fields that provide basic PHY information including modulation and coding scheme (MCS) and packet length. The WiFi receiver 112 can decode the data portion of the WiFi signal based on the relevant PHY information.

After the WiFi preambles are detected and demodulated, the LTE receiver 116 can suppress the WiFi interference based on the information generated by the demodulator 152.

After the WiFi preambles are detected, demodulated, and decoded, the LTE receiver 116 can cancel the WiFi interference based on the information generated by the decoder 154 and the encoder 156.

For example, the STF field provides timing information of the WiFi signals, and the SIG field indicates a length of the WiFi signals. The interference suppression module 160 can suppress the WiFi signals (interference) using the information generated by the demodulator 152. For example, the LTF field enables the LTE receiver 116 to estimate the WiFi channel information. WiFi channels may be re-sampled/interpolated based on LTE sampling rates.

In FIG. 4B, the interference suppression module 160 includes a whitening filter 170, a rejection filter 172, and a correlator 174. To suppress interference from the WiFi signals, the whitening filter 170 can be applied to the interfered portion of the received LTE signals. Alternatively, the rejection filter 172 can be used to suppress interference, which can enhance the performance of the demodulator 152.

Interference suppression can be used in time domain and/or frequency domain. Accordingly, the whitening filter 170 can include a time domain whitening filter and/or a frequency domain whitening filter, and the rejection filter 172 can include a time domain rejection filter and/or a frequency domain rejection filter.

In the time domain, suppose that the received LTE signals are represented as follows:

$$y(t) = \underbrace{h(t)*s(t)}_{LTE\ signals} + \underbrace{n(t)}_{AWGN} + \underbrace{h'(t)*s'(t)}_{WiFi\ Interference} =$$

$$h(t)*s(t)+w(t) \xrightarrow{sampling} y[n] = h[n]*s[n]+w[n]$$

The statistics of "colored" noise w depend on the channel information of the WiFi signals.

For example, a time-domain whitening filter can be applied to suppress the noise.

$$\tilde{y}(t)=f(t)*y(t)=\tilde{h}(t)*s(t)+\tilde{w}(t) s.t. E(\tilde{w}(t)\tilde{w}^*(t+\tau))=\delta(\tau)$$

After applying the whitening filter, the colored noise is transformed into white noise, which can then be filtered using normal noise filtering techniques. The whitening filter 170 can also be applied after sampling. The whitening filter can also be applied across receive antennas.

In the frequency domain, suppose that the received signals are represented as follows:

$$Y[k]=H[k]s[k]+W[k] \text{ where } E[WW^H]=W_{DFT}\cdot E[ww^H]\cdot W_{DFT}^H$$

The correlator 174 correlates the interference across receive antennas as well as tones. For example, a frequency domain whitening filter is applied to suppress the noise. The frequency domain whitening filter can use tone-by-tone whitening for low complexity to ignore cross-tone interference.

$$\tilde{Y}[k]=F[k]Y[k]=\tilde{H}[k]s[k]+\tilde{W}[k] \text{ where } E[\tilde{W}[k]\tilde{W}[k]^H]=I_{RX}$$

and where RX denotes number of receive antennas. The frequency domain whitening filter can use a multiple-tone whitening filter for better performance but higher complexity. The number of tones whitened together can be configurable or adaptively selected.

The interference rejection filter can also be used to suppress interference. Again, the tone-by-tone or multiple tone solution can be used. For example, a tone-by-tone minimum mean square error (MMSE) interference rejection filter can be mathematically expressed as follows:

$$\tilde{S}[k]=H^H[k](H[k]H^H[k]+E[W[k]W^H[k]])^{-1}Y[k]$$

The LTE receiver 116 can also cancel incoming WiFi interference. The interference cancellation module 162 can cancel the WiFi signals (interference) after decoding the WiFi packet. The decoder 154 can decode the WiFi packet after the SIG field is decoded. The detection module 164 can detect the portion or portions of the received LTE signals that are interfered by the WiFi signals based on the information generated by the demodulator 152 and the decoder 154 (e.g., timing and length of the WiFi packet). The interference cancellation module 162 can cancel the interference by subtracting the WiFi signals from the interfered portion or portions of the received LTE signals as follows.

The interference cancellation module 162 can use either hard feedback or soft feedback from the decoder 154 and the encoder 156 for interference cancellation. In hard feedback, the encoder 156 re-encodes the decoded WiFi packet. The interference cancellation module 162 subtracts the re-encoded WiFi packet from the interfered portion of the received LTE signals. In soft feedback, the decoder 154, which may include an iterative decoder, outputs soft information for each bit. Based on the soft information, the interference cancellation module 162 subtracts an expectation (e.g., an estimate) of each transmitted WiFi symbol from the received LTE signals.

Interference cancellation can be applied in time domain and/or frequency domain. In time domain, the interference cancellation can be mathematically expressed as follows:

$$y(t)=h(t)*s(t)+n(t)+h'(t)*s'(t) \rightarrow \tilde{y}(t)=y(t)-h'(t)*\hat{s}'(t)$$

Interference cancellation can also be applied in digital domain (i.e., at sample level). In frequency domain, the interference cancellation can be mathematically expressed as follows:

$$Y[k] = H[k]s[k] + N[k] + Z[k] \text{ where } Z = W_{DFT}[h'[n]*s'[n]]$$

$$\Downarrow$$

$$\tilde{Y}[k] = Y[k] - \hat{Z}[k] = Y[k] - W_{DFT}[h'[n]*\hat{s}'[n]]$$

The switching module 166 can dynamically select (switch) between interference suppression and interference cancellation based on the type of information available from the WiFi receiver 112. For example, if the WiFi receiver 112 can only demodulate the WiFi signals and cannot further decode the WiFi signals, the switching module 166 selects the interference suppression module 160. If, however, the WiFi receiver 112 can demodulate and also decode the WiFi signals, the switching module 166 selects the interference cancellation module 162. Further, the switching module 166 can determine whether to select the interference suppression module 160 or the interference cancellation module 162 depending on other criteria including hardware cost, processing delay, and power savings requirements of the wireless device 100, for example.

FIGS. 5A and 5B show a wireless device 100-1 to illustrate LTE-to-WiFi interference mitigation in an unlicensed frequency band (i.e., mitigating interference to a WiFi network caused by an LTE network when both networks coexist in an unlicensed frequency band). In FIG. 5A, for example, a first receiver 112-1 includes an LTE receiver that receives LTE signals from the second network 104 (e.g., an LTE network) operating in an unlicensed frequency band. For example, a second receiver 116-1 includes a WiFi receiver that receives WiFi signals from the first network 102 (e.g., a WiFi network) operating in the unlicensed frequency band. Suppose that the WiFi receiver 116-1 is a victim of interference caused by unintended signals received from the LTE network 104 operating in the unlicensed frequency band. That is, suppose that unintended LTE signals transmitted over the LTE network 104 interfere with desired WiFi signals received by the WiFi receiver 116-1 from the WiFi network 102. The LTE receiver 112-1 can process the LTE signals at different levels and generate different types of information about the LTE signals. The WiFi receiver 116-1 can use the different types of information to mitigate interference caused by the unintended LTE signals to the desired WiFi signals received by the WiFi receiver 116-1.

For example, the LTE receiver 112-1 may include a complete LTE receiver capable of normally (i.e., fully) processing LTE signals received from the LTE network 104. For example, normal or full processing may include not only demodulating and decoding the LTE signals but also decrypting the decoded LTE signals. Alternatively, the LTE receiver 112-1 may include a partial LTE receiver capable of only demodulating and optionally decoding (i.e., partially processing) LTE signals received from the LTE network 104. For example, partial processing may include demodulating and optionally decoding the LTE signals but may not also include decrypting the decoded LTE signals.

For example, the LTE receiver 112-1 may include only a portion of a physical (PHY) layer and a portion of a medium access control (MAC) layer that are capable of only demodulating and optionally decoding (i.e., partially processing) LTE signals received from the LTE network 104. For example, a complete LTE receiver may include a PHY layer and upper and lower MAC layers capable of normally (i.e., fully) processing LTE signals received from the LTE network 104. A partial LTE receiver, however, may include only portions of the PHY layer and the lower MAC layer that are capable of only demodulating and optionally decoding (i.e., partially processing) LTE signals received from the LTE network 104.

In FIG. 5A, for example, the LTE receiver 112-1 includes a signal strength module 180, a demodulator 182, a decoder 184, an encoder 186, and an energy detector 188. The WiFi receiver 116-1 includes an interference suppression module 190, an interference cancellation module 192, and a switching module 194. The switching module 194 selects the interference suppression module 190 or the interference cancellation module 192 depending on the type of information available from the LTE receiver 112-1.

The signal strength module 180 measures the signal strength of the LTE signal received by the wireless device 100-1. If the signal strength of the LTE signal is less than the predetermined threshold, the wireless device 100-1 does not perform interference mitigation. If the signal strength of the LTE signal is greater than or equal to a predetermined threshold, the wireless device 100-1 performs interference mitigation as follows.

When the signal strength of the LTE signal is greater than or equal to a predetermined threshold, the LTE receiver 112-1 can detect different information about the LTE network 104 without establishing a radio resource control (RRC) connection with an evolved nodeB (eNB) of the LTE network 104. For example, the information may include eNB ID and timing information of the LTE signal, which can be derived from detected primary/secondary sync signals; PHY basic information (e.g., bandwidth BW, number of Tx antennas, control signaling format, frame timing), which can be derived from detected eNB ID and a physical broadcast channel (PBCH) portion of the LTE signal; and channel estimation, which can be derived from detected eNB ID, BW, and cell-specific reference signals (CRS) in the LTE signal; and so on.

The wireless device 100-1 can perform interference suppression or interference cancellation depending on whether the LTE receiver 112-1 can process broadcast information and reference signals in the received LTE signal, one or more control fields in the received LTE signal, or data in the received LTE signal. For example, using one or more of the demodulator 182, the decoder 184, and the encoder 186, the LTE receiver 112-1 may be able to demodulate and/or decode the broadcast information and CRS in the received LTE signal. For example, the broadcast information may include sync signals, a PBCH portion of the LTE signal, and a system information block in a physical downlink shared channel (PDSCH) portion of the LTE signal.

Interference due to the broadcast information and CRS can be either suppressed by the interference suppression module 190 or canceled by the interference cancellation module 192. For example, after decoding the interference, the interference signals can be rebuilt using the encoder 186, and the rebuilt interference signals can be subtracted from the received WiFi signals by the interference cancellation module 192. Alternatively, as shown in FIG. 5B, the interference suppression module 190 may suppress interference using a whitening filter 170-1 and a rejection filter 172-1, which are respectively similar to the whitening filter 170 and the rejection filter 172 of the interference suppression module 160 shown in FIG. 4B.

The LTE signal may include one or more control fields. For example, the control fields may include a physical downlink control channel (PDCCH) portion of the LTE signal, a physical control format indicator channel (PCFICH) portion of the LTE signal, and a physical hybrid ARQ indicator channel (PHICH) portion of the LTE signal. The decoder 184 can decode the PCFICH portion of the received LTE signal although the received LTE signal is not addressed to the LTE receiver 112-1. Accordingly, based on the decoded PCFICH portion of the received LTE signal, the interference suppression module 190 can suppress the interference caused by the LTE signal, or the interference cancellation module 192 can cancel the interference caused by the LTE signal.

The decoder 184, however, cannot decode the PDCCH and PHICH portions of the received LTE signal if the received LTE signal is not addressed to the LTE receiver 112-1. Accordingly, the interference cancellation module 192 cannot cancel the interference caused by the received LTE signal. Instead, the demodulator 182 can demodulate the PDCCH and PHICH portions of the received LTE signal, and the interference suppression module 190 can suppress the interference caused by the received LTE signal based on the information generated by the demodulator 182 by demodulating the PDCCH and PHICH portions of the received LTE signal.

Further, LTE Data in the PDSCH portion of the received LTE signal is mostly un-decodable at an unintended receiver (e.g., at the LTE receiver 112-1 when the received LTE signal is not addressed to the LTE receiver 112-1). Interference suppression, however, can still be performed. For example, the energy detector 188 can detect the energy level of the received LTE signal and determine if data is transmitted in the received LTE signal based on the detected energy level of the received LTE signal. Based on the determination, the interference suppression module 190 can determine whether to suppress interference caused by the received LTE signal. For example, the interference suppression module 190 can suppress the interference when the energy detector 188 detects data in the received LTE signal and does not suppress interference when the energy detector 188 does not detect data in the received LTE signal. The switching module 194 can adaptively turn the interference suppression on or off depending on whether the energy detector 188 detects or does not detect data in the received LTE signal.

The LTE network 104 may provide LTE data transmission information to assist unintended receivers in decoding LTE signals. If the LTE network 104 provides the LTE data transmission information, an unintended receiver (e.g., the LTE receiver 112-1 when the received LTE signal is not addressed to the LTE receiver 112-1) can decode the received LTE signals, and the interference cancellation module 192 can perform interference cancellation based on the LTE data transmission information received from the LTE network 104.

Interference suppression and interference cancellation can be adaptively selected. The following examples include situations where the switching module 194 may select interference suppression instead of interference cancellation: Interference cannot be decoded (e.g., the PDSCH portion of the received LTE signal cannot be decoded without assistance information from the network); Interference strength is low and cannot be decoded; Interference information is not reliable; Buffering for interference decoding causes an intolerable delay or requires larger buffer size; Interference decoding complexity/cost is very high for a particular interference. Accordingly, the switching module 194 may adaptively switch interference mitigation methods.

The following is a summary of the interference mitigation methods that can be used by wireless receivers experiencing interference from another network using a different wireless radio technology (e.g., WiFi-to-LTE or LTE-to-WiFi interference). An assisting receiver of the interfering network can detect relevant PHY information to enable interference mitigation (e.g., preamble detection in WiFi-to-LTE interference, and Sync/PBCH/CRS detection in LTE-to-WiFi interference). Basic interference suppression can be performed when the PHY information is available. The basic interference suppression can include, for example, detecting a portion of the signal under interference, obtaining a channel estimation of the interference, and performing interference suppression in time domain and/or frequency domain. Advanced interference cancellation can be performed if the assisting receiver can decode the interfering signal. The advanced interference cancellation can include, for example, decoding data field in WiFi-to-LTE interference, and decoding PBCH/CRS/SS/SIB/PCFICH/(possibly) PDSCH portions of the LTE signal in LTE-to-WiFi interference. Further, interference cancellation and interference suppression can be adaptively selected based on interference strength, reliability of interference information, and cost of obtaining interference information (e.g., due to additional hardware, processing time, delay, and so on), for example.

The following discussion relates to coexistence of WiFi with LTE networks in an unlicensed frequency band (LTE-U). When LTE networks are deployed in the unlicensed frequency band, the LTE networks may or may not adopt coexistence mechanisms such as listen-before-talk (LBT) to coexist with wireless technologies such as WiFi in the unlicensed frequency band. Even with LBT, collisions and interference between LTE and WiFi networks are inevitable due to limitation and practical imperfection of LBT. Accordingly, WiFi devices need to adopt protective mechanisms in order to coexist with LTE networks in the unlicensed frequency band. Using these protective mechanisms, the WiFi devices can minimize interference to the LTE networks and protect the WiFi devices from interference by the LTE networks.

Different types of LTE transmissions in the unlicensed band can cause interference to the WiFi devices. The WiFi devices need to protect themselves from these LTE transmissions. These LTE transmissions include the following: secondary downlink (DL) carrier(s) in frequency division duplexing (FDD) mode, primary DL carrier in FDD mode, secondary carrier(s) (both uplink (UL) and DL) in time division duplexing (TDD) mode, and primary carrier (both UL and DL) in TDD mode. Periodic or always-on transmissions include secondary DL carrier: PBCH, Sync signals, CRS; and primary DL carrier: PBCH, Sync signals, CRS, System information in PDSCH. Fixed-timing transmissions include ACK/NACK in both UL (PUCCH or PUSCH) and DL (PHICH), retransmission in UL (PUSCH), CQI report (PUCCH or PUSCH), and semi-persistent data (SPS PDSCH).

Coexistence of WiFi with LTE-U networks can be broadly classified into two categories. Coexistence of an LTE-U-aware WiFi device with an LTE-U network, and coexistence of an LIE-U-unaware WiFi device (e.g., a Legacy device) with an LTE-U network. An LTE-U-aware WiFi device can coexist with an LTE-U network by scanning potential LTE-U transmission and monitor existing LTE-U transmission, and by either yielding to the LTE-U network or by causing the LTE-U network to yield to the WiFi network and protecting the WiFi device and the WiFi network from LTE-U deployment when operating in the unlicensed frequency band.

An LTE-U-unaware WiFi device can coexist with an LTE-U network as follows. The LIE-U-unaware WiFi device can only perform carrier sensing before accessing the frequency channel. Accordingly, the LTE-U-unaware WiFi device may miss detection of LTE signals or collision of WiFi packet and LTE signals. The LTE-U-unaware WiFi device depends on other LTE-U-aware devices for protection, and/or depends on LBT.

Figure 6B:
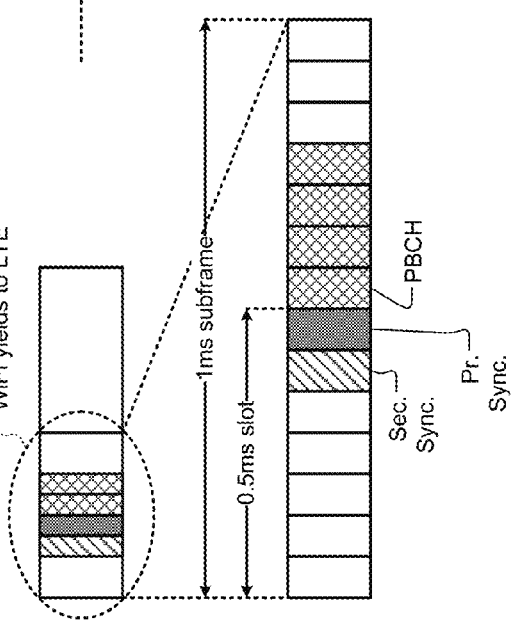
FIG. 6B depicts a Long Term Evolution (LTE) frame.
Figure 6A:
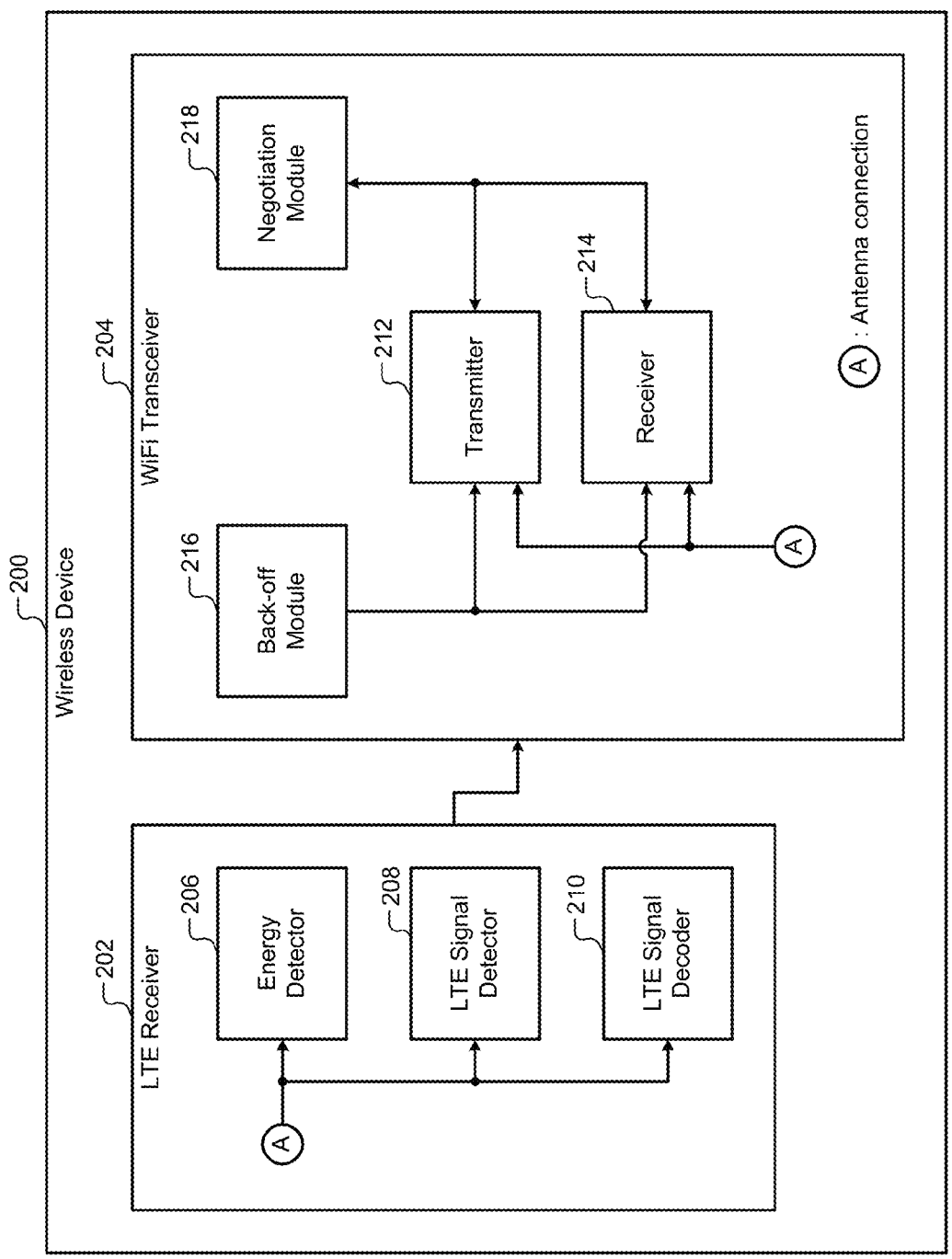
FIG. 6A is a functional block diagram of a WiFi device configured to communicate with a WiFi network while coexisting with a cellular network in an unlicensed frequency band.
Figure 6C:
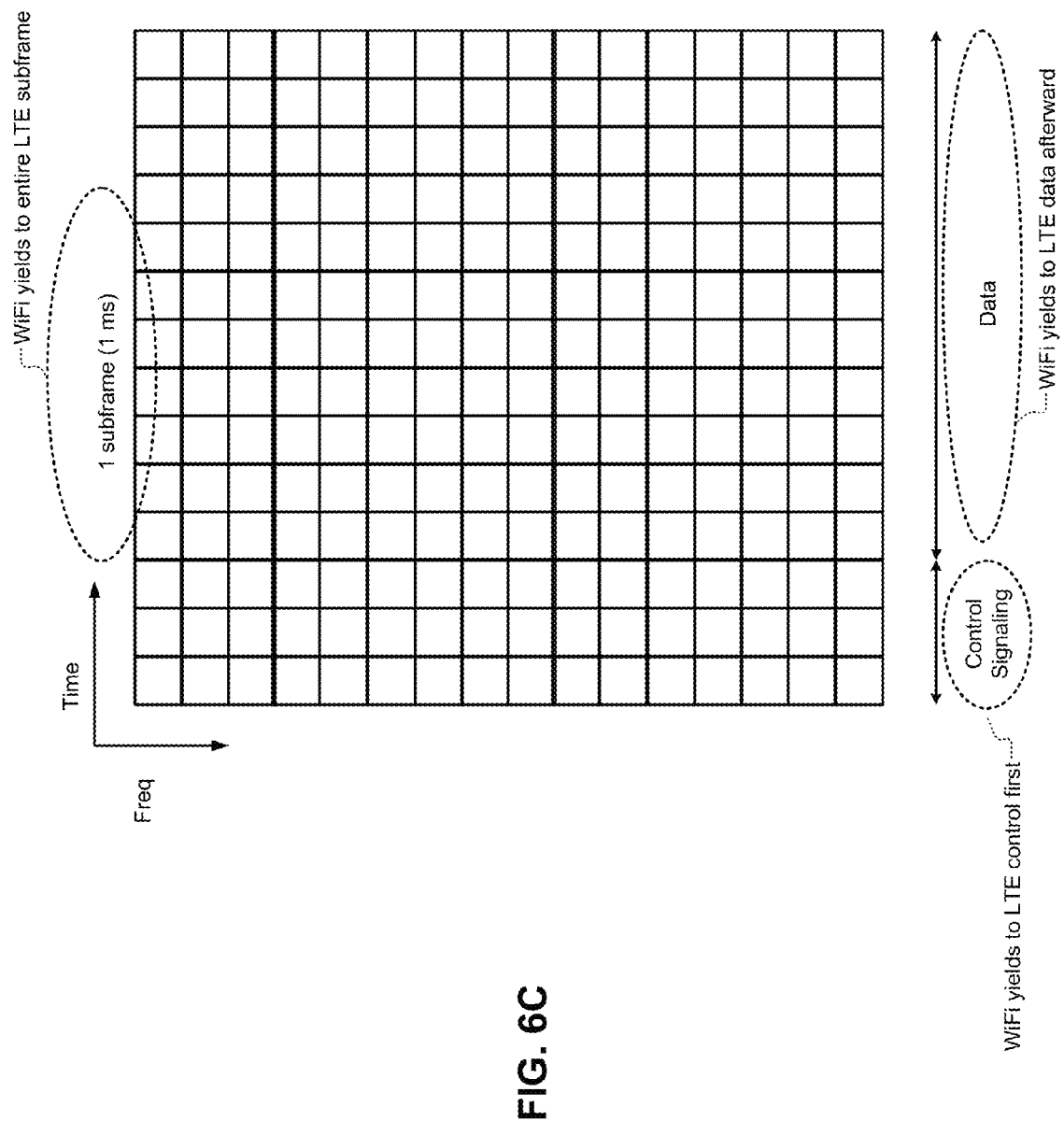
FIG. 6C depicts control and data portions of a LTE subframe.

FIGS. 6A-6C show a wireless device 200 that can communicate with the WiFi network 102 coexisting with the LTE network 104 in an unlicensed frequency band. The wireless device 200 is an LTE-U-aware WiFi device comprising an LTE receiver 202 and a WiFi transceiver 204. The LTE receiver 202 may include a complete LTE receiver or preferably a partial LTE receiver. For example, the LTE receiver 202 may be capable of normally (i.e., fully) processing LTE signals received from the LTE network 104. For example, normal or full processing may include not only demodulating and decoding the LTE signals but also decrypting the decoded LTE signals. Alternatively, the LTE receiver 202 may be capable of only demodulating and optionally decoding (i.e., partially processing) LTE signals received from the LTE network 104. For example, partial processing may include demodulating and optionally decoding the LTE signals but may not also include decrypting the decoded LTE signals.

For example, preferably, the LTE receiver 202 may include only a portion of a physical (PHY) layer and a portion of a medium access control (MAC) layer that are capable of only demodulating and optionally decoding (i.e., partially processing) LTE signals received from the LTE network 104. For example, a complete LTE receiver may include a PHY layer and upper and lower MAC layers capable of normally (i.e., fully) processing LTE signals received from the LTE network 104. A partial LTE receiver, however, may include only portions of the PHY layer and the lower MAC layer that are capable of only demodulating and optionally decoding (i.e., partially processing) LTE signals received from the LTE network 104.

The LTE receiver 202 includes an energy detector 206, an LTE signal detector 208, and an LTE signal decoder 210. The WiFi transceiver 204 includes a transmitter 212, a receiver 214, a back-off module 216, and a negotiation module 218. The WiFi transceiver 204 defers channel access and yields to the LTE network 104 or claims the frequency channel and causes the LTE network 104 to yield as follows.

The energy detector 206 detects an energy level (e.g., signal strength) of the received LTE signal. The LTE signal detector 208 can detect (i.e., identify) a received signal as being an LTE signal. For example, the LTE signal detector 208 can scan an LTE OFDM symbol and can perform cyclic prefix (CP) detection. The LTE signal decoder 210 can implement different levels of scanning and decoding techniques to decode the received LTE signal. For example, the LTE signal decoder 210 can try to detect LTE sync signals, confirm that the received signal is in fact an LTE signal, generate timing information of the received LTE signal, and also obtain Tx (eNB) ID from cell-specific reference signals (CRS) in the received LTE signal. The LTE signal decoder 210 can try to decode the PBCH portion of the received LTE signal and generate LTE PHY info (BW, number of Tx antennas, frame timing, and control signal format). The LTE signal decoder 210 can try to decode the PCFICH portion of the received LTE signal and generate LTE control signal duration. The LTE signal decoder 210 can try to decode a SIB portion of the received LTE signal and derive information about LTE cell-specific configuration.

Based on the information generated by the LTE receiver 202, the WiFi transceiver 204 can determine whether to defer channel access after the LTE receiver 202 detects an LTE signal. For example, based on the information generated by the LTE receiver 202, the back-off module 216 can determine whether to back-off and defer access to the frequency channel after the LTE receiver 202 detects an LTE signal. For example, the back-off module 216 can add a predetermined delay (e.g., inns) before sensing carrier again. Alternatively, the back-off module 216 can add an adaptive opportunistic amount of delay before sensing carrier again.

FIG. 6B shows an LTE frame including a plurality of subframes. For example, a 10 ms LTE frame may include ten 1 ms subframes. Each subframe may include periodic LTE signals (e.g., significant signaling in LTE (e.g., PBCH/SIB/Sync)). The LTE signal detector 208 and the LTE signal decoder 210 can detect the periodic LTE signals and generate timing information based of the periodic LTE signals. Based on the timing information of the periodic signals, the WiFi transceiver 204 can yield to LTE significant signals at the exact timing and for the exact duration of the LTE significant signals. For example, the back-off module 216 can defer channel access at the exact timing and for the exact duration of the LTE significant signals. The transmitter 212 can select a packet size that the transmitter 212 can finish transmitting (and allow sufficient time to receive ACK) between two consecutive LTE significant signals.

FIG. 6C shows an LTE subframe including a control portion and a data portion. The LTE signal decoder 210 can decode the control portion and determine whether the data portion includes data. Based on the determination, the back-off module 216 can decide whether to defer channel access for a duration of the control portion and whether to defer channel access for a duration of the data portion depending on whether the data portion includes data. The transmitter 212 can schedule transmission of a packet and reception of an acknowledgement in the duration of the data portion in response to the data portion including no data.

Alternatively, the energy detector 206 can sense the energy level of the control portion and subsequently sense the energy level of the data portion. Based on the sensed energy levels, the back-off module 216 can determine whether to defer channel access for a duration of the control portion and whether to defer channel access for a duration of the data portion depending on whether presence of data is sensed in the data portion. The transmitter 212 can schedule transmission of a packet and reception of an acknowledgement in the duration of the data portion if no data is sensed in the data portion.

The LTE receiver 202 can detect a subframe boundary of the received LTE signal. For example, the energy detector 206 can detect the OFDM signal energy for aperiodic and unpredictable LTE transmission. Based on the detected OFDM signal energy, the back-off module 216 can determine the exact back-off time of 1 subframe (1 ms) (including processing time and delay).

Alternatively, the LTE receiver 202 can detect the control signaling duration. For example, based on the energy level of the control signaling detected by the energy detector 206, the back-off module 216 can decide to back-off for the duration of control signaling if the energy detection triggers back-off. The energy detector 206 can detect energy again on data region, and based on the detected energy level of the data region, the back-off module 216 can decide to back-off only for the residual data transmission duration.

In FIG. 6A, an LTE-U-Aware WiFi device (e.g., the wireless device 200) can claim the frequency channel and ask the LTE network 104 to yield (e.g., the LTE network 104 can use another frequency channel in the unlicensed frequency band). For example, the wireless device 200 can facilitate/force the LTE network 104 to dynamically select another frequency channel in the unlicensed frequency band. The wireless device 200 can also assist legacy devices in the WiFi network 102 that are incapable of managing coexistence with the LTE network 104 in the unlicensed frequency band.

The wireless device 200 can facilitate/force the LTE network 104 to dynamically select another frequency channel in the unlicensed frequency band as follows. For example, the wireless device 200 can operate as an access point or a station and can transmit LTE broadcast signals. For example, the transmitter 212 can transmit LTE significant signals (PBCH/Sync/SIB) and can created an appearance of an existence of a pseudo LTE network to an LTE device operating in the LTE network 104. For example, the transmitter 212 can transmit pilot signals (CRS) along with LTE significant signals when the WiFi network 102 is idle to minimize overhead for the WiFi network 102. That is, when the WiFi network 102 is not busy (e.g., when all the stations of the WiFi network 102 are in sleep mode), the transmitter 212 can transmit CRS to assist an LTE device operating in the LTE network 104 in detecting the existence of this pseudo LTE network. This can cause the LTE network 104 to switch to another frequency channel in the unlicensed frequency band. In transmitting these LTE signals, the transmitter 212 can carefully select a cell ID that will force the LTE network 104 to select another frequency channel in the unlicensed frequency band.

Alternatively, the wireless device 200 can operate as an access point or a station, connect to the LTE network 104 (e.g., to an eNB of the LTE network 104), and indicate or report the existence of the WiFi network 102 or a pseudo LTE network to the LTE network 104. For example, if the wireless device 200 is capable of connecting to the LTE network 104, the wireless device 200 can act as a user equipment (UE) and can report to the LTE network 104 the existence of the WiFi network 102 or can inform the LTE network 104 about the existence of an LTE network as a neighboring cell would. This can cause the LTE network 104 to switch to another frequency channel in the unlicensed frequency band.

When the LTE network 104 must or can share the same frequency channel with the WiFi network 102 in the unlicensed frequency band, in addition to using dynamic LBT at both LTE and WiFi networks, negotiations between LTE and WiFi networks can improve the efficiency of both networks. Negotiations can be redone when network load has changed on either network. Initiator of the negotiations can be the network with load change or the other network with a sniffer.

For example, the wireless device 200 operating as an access point or a station can connect to the LTE network 104 (e.g., to an eNB of the LTE network 104) via an X2 interface to negotiate time slots for channel access. Typically, an inter-cell interference coordination mechanism (eICIC) of the LTE network 104 allows eNBs to share a frequency channel in a time division multiplexing (TDM) fashion. The time slots for each eNB can be negotiated among neighboring eNBs. Accordingly, the wireless device 200 can act as an eNB to bargain with a coexisting eNB of the LTE network 104. The negotiating module 218 can negotiate the time slots for sharing the frequency channel of the unlicensed frequency band with the coexisting eNB of the LTE network 104. Alternatively, the wireless device 200 can directly negotiate with an eNB of the LTE network 104 through either the interface (e.g., X2) or another interface.

After negotiation, the wireless device 200 can coordinate sharing of the frequency channel with other WiFi devices (e.g., Legacy devices) in the WiFi network 102. For example, acting as an access point, the wireless device 200 can broadcast the time slots available to the WiFi network 102, so that LTE-U-aware WiFi devices of the WiFi network 102 will access the shared frequency channel (and terminate respective transmissions) accordingly.

The following is a summary of mechanisms that can be utilized for coexistence of WiFi with LTE networks in an unlicensed frequency band (LTE-U). If an LTE network is deployed in an unlicensed frequency band, a WiFi network coexisting with the LTE network in the unlicensed frequency band can adopt coexistence mechanisms. A WiFi device of the WiFi network can use an LTE scanner to detect/predict LTE transmissions. The WiFi device can yield to the LTE network by sensing the LTE transmissions at different levels: yield to LTE significant signaling based on decoding the LTE signals; yield to LTE signals based on energy/signal detection of the LTE signals, and so on. Alternatively, the WiFi device can claim the frequency channel and ask the LTE network to yield by transmitting LTE broadcast signals and/or reporting to an eNB of the LTE network the existence of the WiFi network or another LTE network as a UE of another LTE network would. The WiFi device can negotiate the time slots split with the LTE network, and LTE-U-aware devices of the WiFi network can access the shared frequency channel only in the time slots allotted to the WiFi network.

The WiFi device can coordinate channel access of other devices in the WiFi network according to the time slots allotted to the WiFi network.

Figure 7:
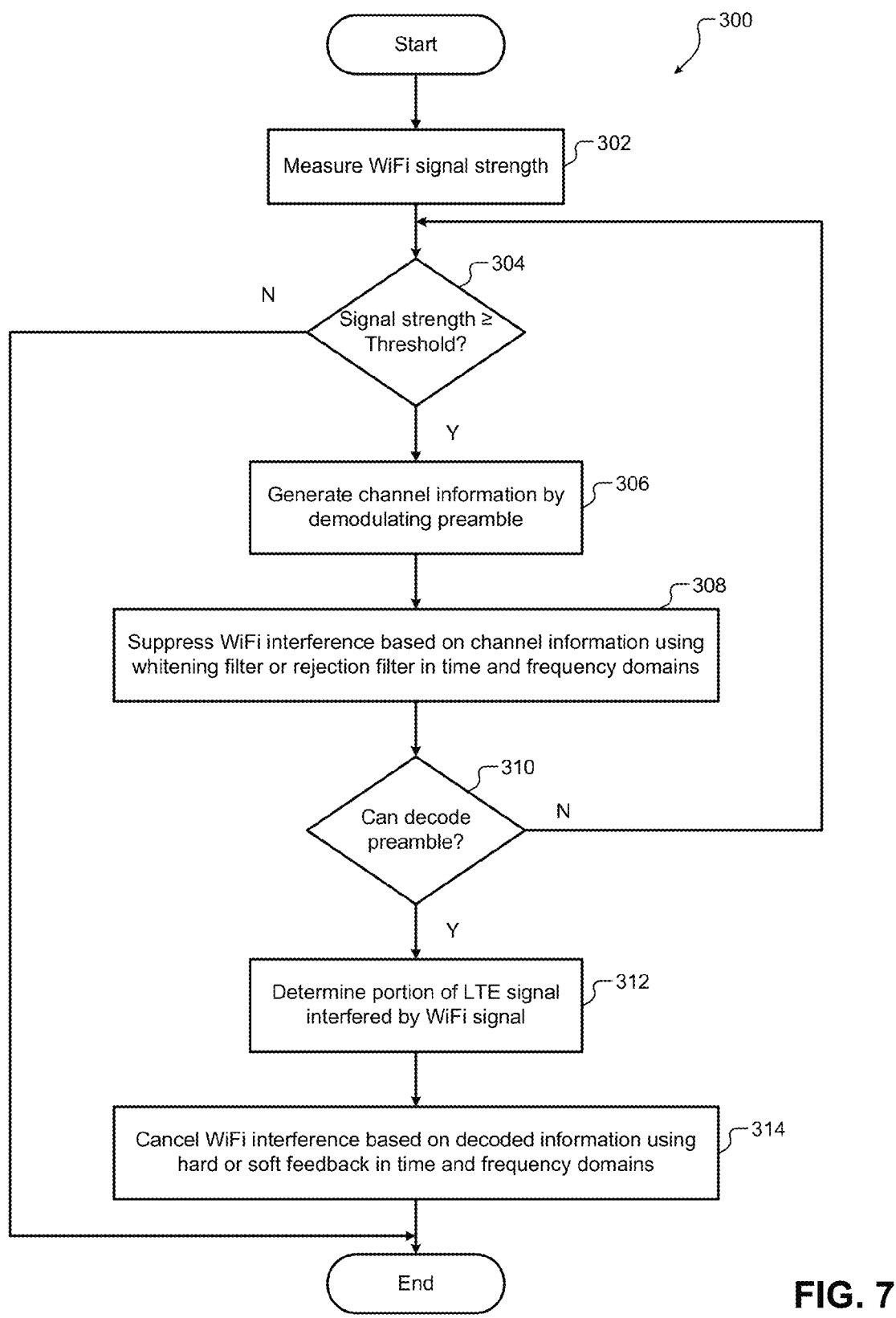
FIG. 7 is a flowchart of a method for mitigating interference when a wireless device communicating using a cellular standard experiences interference from a WiFi network.

FIG. 7 shows a method 300 for mitigating interference when a wireless device communicating using a cellular standard (e.g., LTE) experiences interference from a WiFi network. The wireless device comprises a complete or a partial WiFi receiver capable of at least demodulating and/or decoding a WiFi signal. At 302, the wireless device measures a signal strength of an interfering WiFi signal received from the WiFi network. At 304, the wireless device determines whether the signal strength of an interfering WiFi signal is greater than or equal to a predetermined threshold. The method 300 ends if the signal strength of the interfering WiFi signal is less than the predetermined threshold. At 306, if the signal strength of the interfering WiFi signal is greater than or equal to the predetermined threshold, the wireless device generates channel information by demodulating one or more fields of a preamble of the WiFi signal. At 308, using a whitening filter or a rejection filter in time domain and/or frequency domain, the wireless device suppresses the interference caused by the WiFi signal based on the channel information.

At 310, the wireless device checks whether the WiFi receiver of the wireless device can decode the preamble of the interfering WiFi signal. The method 300 returns to 304 if the WiFi receiver of the wireless device cannot decode the preamble of the interfering WiFi signal. At 312, if the WiFi receiver of the wireless device can decode the preamble of the interfering WiFi signal, the wireless device determines which portion of the received LTE signal is interfered by the WiFi signal based on the timing information of the WiFi signal generated by demodulating the WiFi signal. At 314, the wireless device cancels the interference caused by the WiFi signal based on the decoded information using hard or soft feedback received from the decoder of the WiFi receiver. The wireless device cancels the interference caused by the WiFi signal based on the hard or soft feedback in time domain and/or frequency domain.

Figure 8A:
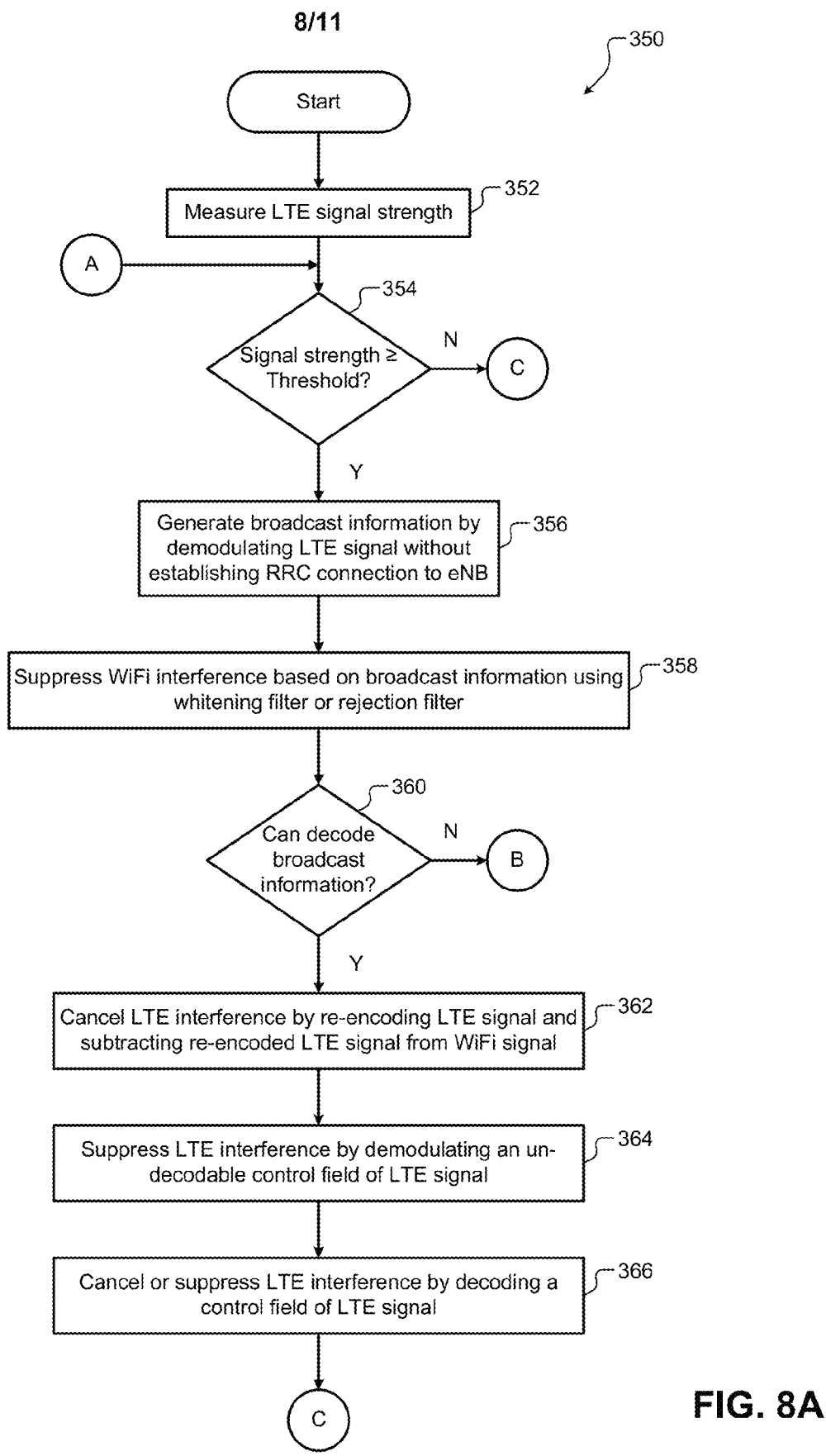
FIGS. 8A and 8B depict a flowchart of a method for mitigating interference when a wireless device communicating using a WiFi standard experiences interference from a cellular network.
Figure 8B:
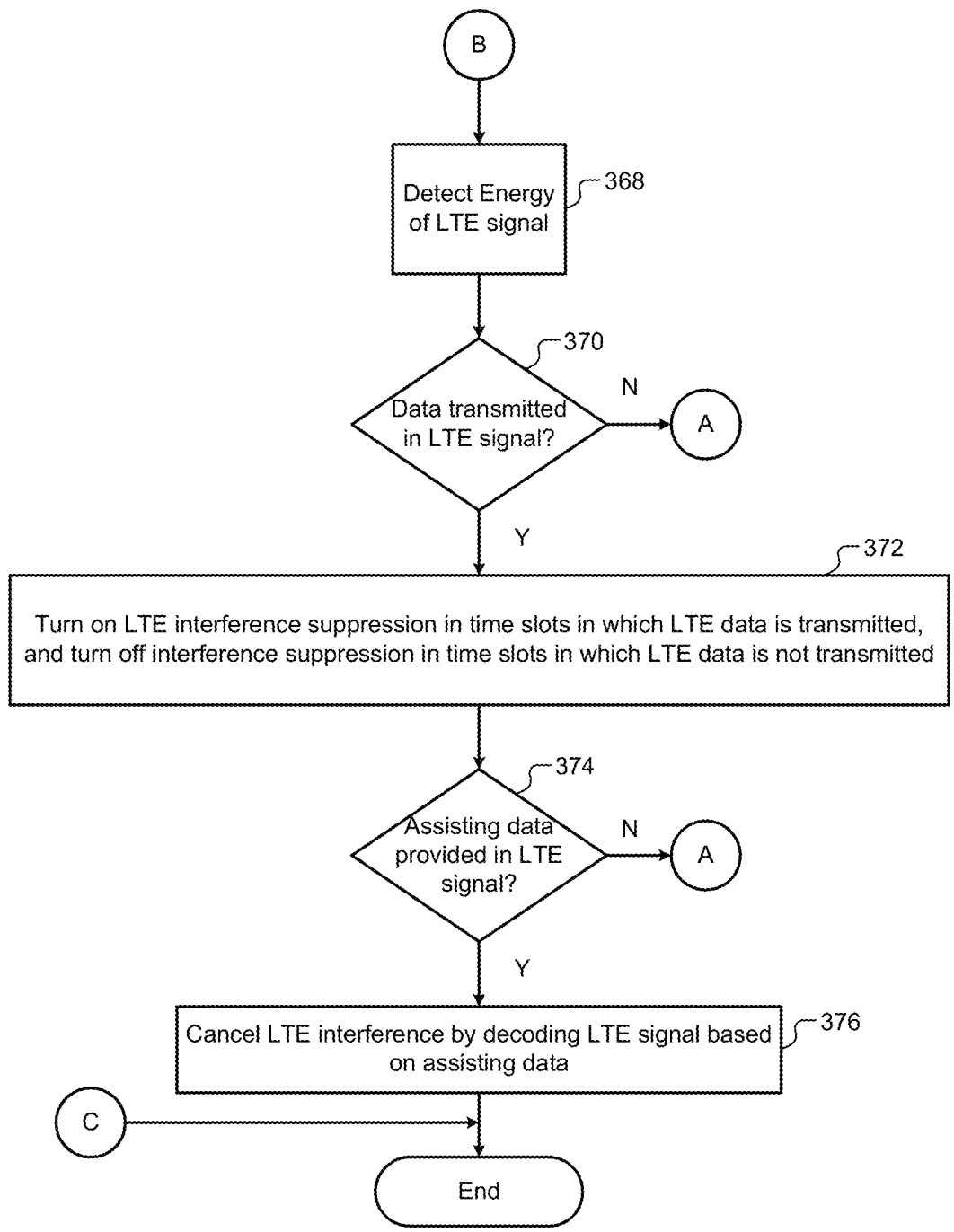

FIGS. 8A and 8B show a method 350 for mitigating interference when a wireless device communicating using a WiFi standard experiences interference from a cellular network (e.g., an LTE network). The wireless device comprises a complete or a partial LTE receiver capable of at least demodulating and/or decoding an LTE signal. At 352, the wireless device measures a signal strength of an interfering LTE signal received from the LTE network. At 354, the wireless device determines whether the signal strength of the interfering LTE signal is greater than or equal to a predetermined threshold. The method 350 ends if the signal strength of the interfering LTE signal is less than the predetermined threshold. At 356, if the signal strength of the interfering LTE signal is greater than or equal to the predetermined threshold, the wireless device generates broadcast information by demodulating one or more portions of the LTE signal without establishing RRC connection to an eNB of the LTE network. At 358, using a whitening filter or a rejection filter in time domain and/or frequency domain, the wireless device suppresses the interference caused by the LTE signal based on the broadcast information.

At 360, the wireless device checks whether the LTE receiver of the wireless device can decode the broadcast information of the interfering LTE signal. At 362, if the LTE receiver of the wireless device can decode the broadcast information of the interfering LTE signal, the wireless device cancels the interference caused by the LTE signal by re-encoding the LTE signal based on the decoded information and by subtracting the re-encoded LTE signal from the WiFi signal. At 364, the wireless device can also suppress the interference caused by the LTE signal by demodulating an un-decodable control field of the interfering LTE signal. At 366, the wireless device can also cancel or suppress the interference caused by the LTE signal by decoding a control field of the interfering LTE signal.

At 368, if the LTE receiver of the wireless device cannot decode the broadcast information of the interfering LTE signal, the LTE receiver of the wireless device detects an energy level of the interfering LTE signal. At 370, based on the detected energy level, the LTE receiver of the wireless device determines whether data is transmitted in the interfering LTE signal. Based on the detected energy level, if the LTE receiver of the wireless device determines that no data is transmitted in the interfering LTE signal, the wireless device turns off interference suppression, and the method 350 returns to 354. At 372, based on the detected energy level, if the LTE receiver of the wireless device determines that data is transmitted in the interfering LTE signal, the wireless device turns on interference suppression in time slots in which data is transmitted in the interfering LTE signal. The wireless device adaptively turns interference suppression on and off in time slots in which data is not and is transmitted in the interfering LTE signal.

At 374, the LTE receiver of the wireless device determines whether assisting data for decoding the LTE signal is provided by the LTE network in the interfering LTE signal received. The method 350 returns to 354 if assisting data for decoding the LTE signal is not provided by the LTE network in the interfering LTE signal received. At 376, if assisting data for decoding the LTE signal is provided by the LTE network in the interfering LTE signal received, the LTE receiver of the wireless device decodes the received interfering LTE signal based on the assisting data. The wireless device cancels the interference caused by the received LTE signal based on the decoded information.

Figure 9:
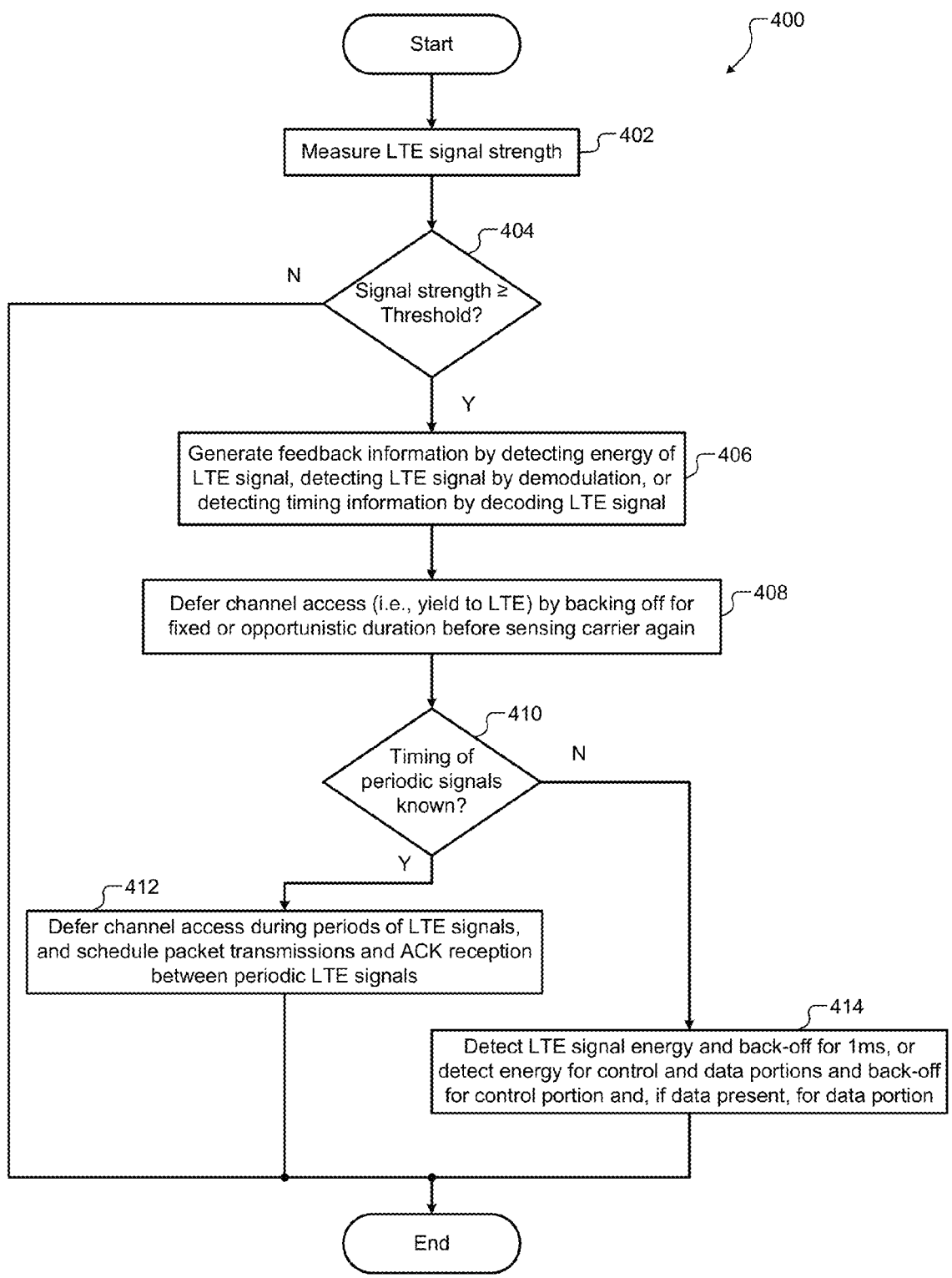
FIG. 9 is a flowchart of a method for coexistence of WiFi and cellular networks in an unlicensed frequency band, where a WiFi device yields to the cellular network.

FIG. 9 shows a method 400 for coexistence of WiFi and cellular networks in an unlicensed frequency band, where a WiFi device yields to the LTE network. The WiFi device comprises a complete or a partial LTE receiver capable of demodulating and/or decoding an LTE signal. At 402, the wireless device measures a signal strength of an LTE signal received from the LTE network. At 404, the wireless device determines whether the signal strength of the LTE signal is greater than or equal to a predetermined threshold. The method 400 ends if the signal strength of the LTE signal is less than the predetermined threshold. At 406, if the signal strength of the LTE signal is greater than or equal to the predetermined threshold, the wireless device generate feedback information by detecting an energy level of the LTE signal, detecting the LTE signal by demodulation, or detecting timing information of the LTE signal by decoding the LTE signal. At 408, the wireless device defers channel access (i.e., yields to the LTE network) by backing off for a fixed duration (e.g., 1 ms) or for an opportunistic duration (adaptively or dynamically determined) before sensing carrier again.

At 410, the LTE receiver of the WiFi device determines if timing of periodic LTE signals can be known from the LTE signals received from the LTE network. At 412, if the timing of periodic LTE signals is known, the WiFi device defers channel access (i.e., yields to the LTE network) during periods of LTE signals. The WiFi device schedules transmission of one or more WiFi packets and reception of corresponding ACKs between two consecutive periodic LTE signals. At 414, if the timing of periodic LTE signals is unknown, the LTE receiver of the WiFi device detects an energy level of the LTE signal, and based on the detected energy level of the LTE signal, the WiFi device backs off for a duration of a subframe of the LTE signal (e.g., 1 ms). Alternatively, if the timing of periodic LTE signals is unknown, the LTE receiver of the WiFi device detects energy levels of control and or portions of the LTE signal, and based on the detected energy levels, the WiFi device backs off first for the duration of the control portion of the LTE signal and then for the duration of the data portion of the LTE signal if data is present in the data portion of the LTE signal.

Figure 10:
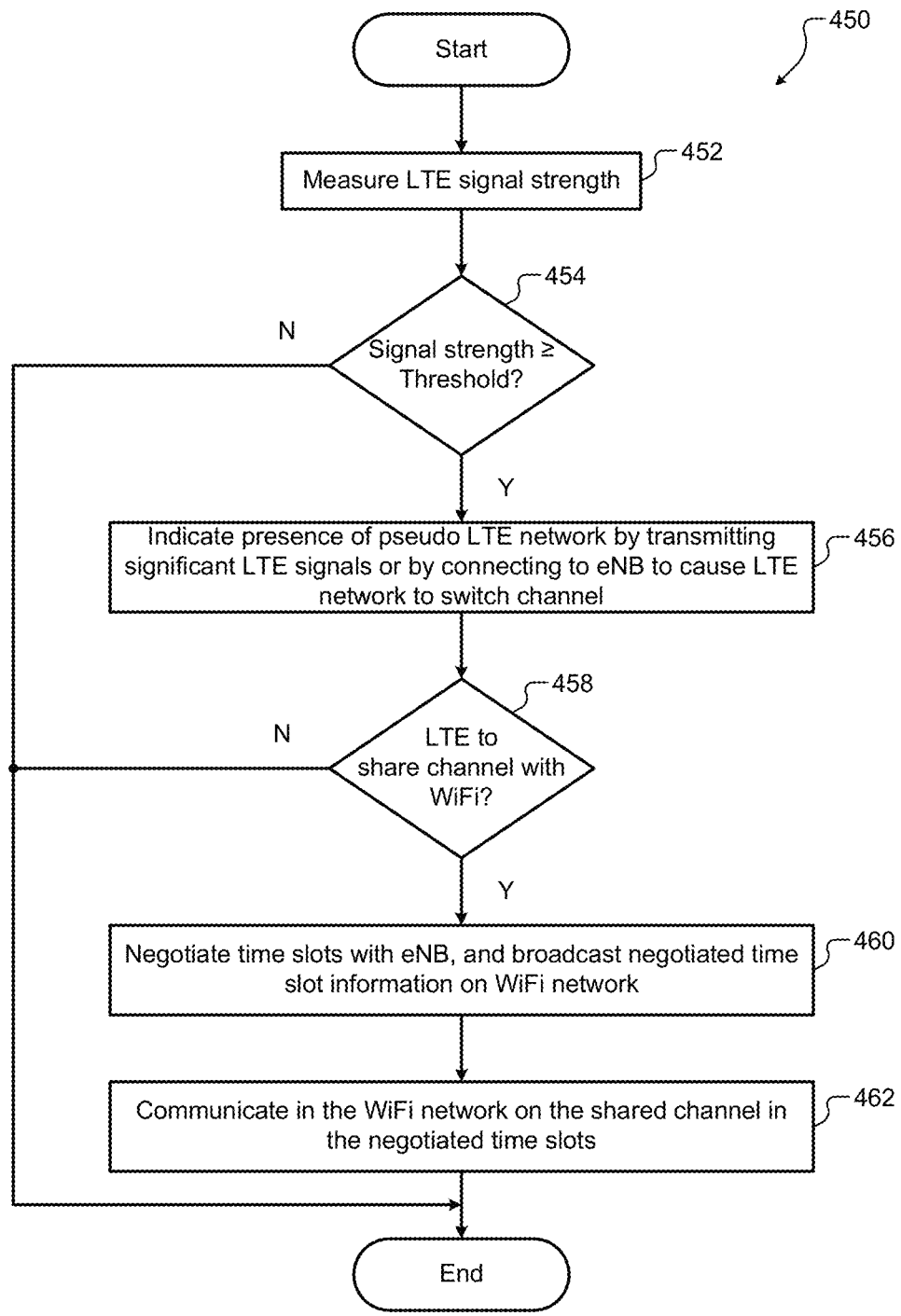
FIG. 10 is a flowchart of a method for coexistence of WiFi and cellular networks in an unlicensed frequency band, where the cellular network yields to the WiFi network or the two networks share a frequency channel of the unlicensed frequency band.

FIG. 10 shows a method 450 for coexistence of WiFi and cellular networks in an unlicensed frequency band, where a WiFi device can facilitate/force the LTE network to yield to the WiFi network by dynamically selecting another frequency channel in the unlicensed frequency band. Alternatively, the WiFi and LTE networks can negotiate time slots for sharing the same frequency channel of the unlicensed frequency band. The WiFi device comprises a complete or a partial LTE receiver capable of demodulating and/or decoding an LTE signal.

At 452, the WiFi device measures a signal strength of an LTE signal received from the LTE network. At 454, the WiFi device determines whether the signal strength of the LTE signal is greater than or equal to a predetermined threshold. The method 450 ends if the signal strength of the LTE signal is less than the predetermined threshold.

At 456, if the signal strength of the LTE signal is greater than or equal to the predetermined threshold, the WiFi device indicates a presence of a pseudo LTE network to the LTE network by transmitting significant LTE signals when the WiFi network is idle. Indicating the presence of a pseudo LTE network forces the LTE network to select another frequency channel in the unlicensed frequency band. The WiFi device may select a cell ID and include the selected cell ID when transmitting the significant LTE signals that will force the LTE network to select another frequency channel in the unlicensed frequency band. Alternatively, the WiFi device can connect to the LTE network and report the existence of the WiFi network or a pseudo LTE network to the LTE network. For example, the WiFi device can act as a UE and report the existence of the WiFi network or an LTE network as a neighboring cell would. This can cause the LTE network to switch to another frequency channel in the unlicensed frequency band.

At 458, the WiFi device determines whether the LTE network must or can share the same frequency channel with the WiFi network. The method 450 returns to 454 if the LTE network can use another frequency channel in the unlicensed frequency band. At 460, if the LTE network must or can share the same frequency channel with the WiFi network, the WiFi device negotiates time slots with an eNB of the LTE network and broadcasts the negotiated time slot information on the WiFi network. At 462, the WiFi device (and other WiFi devices in the WiFi network) communicates in the WiFi network on the shared frequency channel in the negotiated time slots. Accordingly, the WiFi and LTE networks share the same frequency channel in the unlicensed frequency band.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, and/or draft IEEE standard 802.11ah.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A wireless device comprising:
   a first receiver configured to
      receive a first signal transmitted on a first network using a first communication protocol, and
      generate, in response to a signal strength of the first signal being greater than or equal to a predetermined threshold, at least one of first information about the first signal based on a first portion of the first signal and second information about the first signal based on a second portion of the first signal,
      wherein the first receiver includes a portion of a physical layer and a portion of a medium access control layer and is configured to process (i) the first portion of the first signal and (ii) the second portion of the first signal; and
   a second receiver configured to
      receive a second signal transmitted on a second network using a second communication protocol,
      suppress at least a portion of interference from the first signal based on the first information about the first signal in response to the first receiver generating the first information, and cancel interference from the first signal based on the first information and the second information about the first signal in response to the first receiver generating the first information and the second information, wherein the first communication protocol is different from the second communication protocol, wherein the first receiver and the second receiver are co-located in the wireless device, and wherein the first receiver and the second receiver are configured to communicate in an unlicensed frequency band.

2. The wireless device of claim 1, wherein: the first communication protocol includes a WiFi protocol; and the second communication protocol includes a cellular protocol.

3. The wireless device of claim 2, wherein:
the first receiver is configured to process a preamble of the first signal including (i) the first portion of the first signal and (ii) the second portion of the first signal.

4. The wireless device of claim 3, wherein:
the first portion of the first signal includes a short training field and a long training field of the preamble of the first signal; and
the second portion of the first signal includes a signal field of the preamble of the first signal.

5. The wireless device of claim 3, wherein:
the first receiver is configured to generate second information about the first signal based on the second portion of the first signal; and
the second receiver is configured to cancel interference from the first signal based on the second information about the first signal.

6. The wireless device of claim 5, wherein the second receiver is configured to dynamically switch between suppressing interference and cancelling interference depending on whether the first information or the second information is available.

7. The wireless device of claim 5, wherein the second receiver is configured to:
detect, based on one or more of (i) the first information and (ii) the second information, a portion of the second signal that is interfered by the first signal; and
suppress interference from the portion of the second signal using (i) a whitening filter or (ii) a rejection filter.

8. The wireless device of claim 5, wherein the second receiver is configured to:
detect, based on one or more of (i) the first information and (ii) the second information, a portion of the second signal that is interfered by the first signal; and
cancel interference from the portion of the second signal using feedback from the first receiver.

9. The wireless device of claim 8, wherein:
the first receiver is configured to decode the first signal, re-encode the first signal, and feedback the re-encoded first signal to the second receiver; and
the second receiver is configured to cancel interference by subtracting the re-encoded first signal from the portion of the second signal that is interfered by the first signal.

10. The wireless device of claim 8, wherein:
the first receiver is configured to decode the first signal, generate soft information, generate an estimate of each symbol transmitted in the first signal, and feedback the estimate to the second receiver; and
the second receiver is configured to cancel interference by subtracting the estimate from the portion of the second signal that is interfered by the first signal.

11. The wireless device of claim 2, wherein the second receiver comprises a time-domain whitening filter configured to suppress interference from the first signal across a plurality of receive antennas.

12. The wireless device of claim 2, wherein the second receiver comprises a correlator configured to suppress interference by correlating interference from the first signal across a plurality of receive antennas and tones.

13. The wireless device of claim 2, wherein the second receiver comprises a frequency-domain whitening filter configured to suppress interference from the first signal using tone-by-tone whitening and by disregarding cross-tone interference.

14. The wireless device of claim 2, wherein the second receiver comprises a frequency-domain whitening filter configured to suppress interference from the first signal using multiple-tone whitening, wherein a number of tones whitened together is predetermined or adaptively selected.

15. The wireless device of claim 1, wherein: the first communication protocol includes a cellular protocol; and the second communication protocol includes a WiFi protocol.

16. The wireless device of claim 15, wherein:
the first receiver is configured to process, without establishing a connection with a base station at a layer higher than the medium access control layer, (i) the first portion of the first signal and (ii) the second portion of the first signal; and
the first portion and the second portion of the first signal exclude a data portion of the first signal.

17. The wireless device of claim 16, wherein:
the first portion of the first signal includes information broadcast by the base station; and
the second receiver is configured to suppress interference in response to the first receiver demodulating the first portion of the first signal including information broadcast by the base station.

18. The wireless device of claim 17, wherein the second receiver is configured to suppress interference using (i) a whitening filter or (ii) a rejection filter.

19. The wireless device of claim 16, wherein:
the first portion of the first signal includes information broadcast by the base station; and
the second receiver is configured to cancel interference in response to the first receiver decoding the first portion of the first signal including information broadcast by the base station.

20. The wireless device of claim 19, wherein:
the first receiver is configured to re-encode the first signal and feedback the re-encoded first signal to the second receiver; and
the second receiver is configured to cancel interference by subtracting the re-encoded first signal from the second signal.

21. The wireless device of claim 16, wherein:
the second portion of the first signal includes information that is not addressed to the first receiver and that is un-decodable at the first receiver; and
the second receiver is configured to suppress interference based on the second portion of the first signal in response to the first receiver demodulating the second portion of the first signal including information (i) not addressed to the first receiver and (ii) un-decodable at the first receiver.

22. The wireless device of claim 16, wherein:
the second portion of the first signal includes information that is not addressed to the first receiver and that is decodable at the first receiver; and the second receiver is configured to suppress or cancel interference based on the second portion of the first signal in response to the first receiver decoding the second portion of the first signal including information (i) not addressed to the first receiver and (ii) decodable at the first receiver.

23. The wireless device of claim 15, wherein:
the first receiver is configured to detect energy of the first signal and determine, based on the detected energy, whether data is transmitted in the first signal; and
the second receiver is configured to (i) suppress interference in response the first receiver determining that data is transmitted in the first signal and (ii) turn off interference suppression in response the first receiver determining that data is not transmitted in the first signal.

24. The wireless device of claim 15, wherein:
the first receiver is configured to decode the first signal in response (i) the first signal being not addressed to the first receiver and (ii) the first signal including information to assist the first receiver in decoding a data portion of the first signal; and
the second receiver is configured to cancel interference in response the first receiver decoding the data portion of the first signal.

25. A method comprising:
receiving, at a first receiver, a first signal transmitted on a first network using a first communication protocol;
generating, at the first receiver, in response to a signal strength of the first signal being greater than or equal to a predetermined threshold, at least one of first information about the first signal based on a first portion of the first signal and second information about the first signal based on a second portion of the first signal;
receiving, at a second receiver, a second signal transmitted on a second network using a second communication protocol;
suppressing, at the second receiver, at least a portion of interference from the first signal based on the first information about the first signal in response to the first receiver generating the first information;
cancel interference from the first signal based on the first information and the second information about the first signal in response to the first receiver generating the first information and the second information;
communicating, using the first receiver and the second receiver, in an unlicensed frequency band, wherein the first receiver includes a portion of a physical layer and a portion of a medium access control layer; and
processing, using the portion of the physical layer and the portion of the medium access control layer of the first receiver, (i) the first portion of the first signal and (ii) a second portion of the first signal,
wherein the first communication protocol is different from the second communication protocol, and
wherein the first receiver and the second receiver are co-located in a wireless device.

26. The method of claim 25, wherein:
the first communication protocol includes a WiFi protocol; and
the second communication protocol includes a cellular protocol.

27. The method of claim 26, further comprising:
processing, using the portion of the physical layer and the portion of the medium access control layer of the first receiver, a preamble of the first signal including (i) the first portion of the first signal and (ii) the second portion of the first signal.

28. The method of claim 27, wherein:
the first portion of the first signal includes a short training field and a long training field of the preamble of the first signal; and
the second portion of the first signal includes a signal field of the preamble of the first signal.

29. The method of claim 27, further comprising:
generating, at the first receiver, second information about the first signal based on the second portion of the first signal; and
canceling, at the second receiver, interference from the first signal based on the second information about the first signal.

30. The method of claim 29, further comprising dynamically switching, at the second receiver, between suppressing interference and cancelling interference depending on whether the first information or the second information is available.

31. The method of claim 29, further comprising, at the second receiver:
detecting, based on one or more of (i) the first information and (ii) the second information, a portion of the second signal that is interfered by the first signal; and
suppressing interference from the portion of the second signal using (i) a whitening filter or (ii) a rejection filter.

32. The method of claim 29, further comprising, at the second receiver:
detecting, based on one or more of (i) the first information and (ii) the second information, a portion of the second signal that is interfered by the first signal; and
canceling interference from the portion of the second signal using feedback from the first receiver.

33. The method of claim 32, further comprising:
at the first receiver, decoding the first signal, re-encoding the first signal, and providing the re-encoded first signal to the second receiver; and
at the second receiver, canceling interference by subtracting the re-encoded first signal from the portion of the second signal that is interfered by the first signal.

34. The method of claim 32, further comprising:
at the first receiver, decoding the first signal, generating soft information, generating an estimate of each symbol transmitted in the first signal, and providing the estimate to the second receiver; and
at the second receiver, canceling interference by subtracting the estimate from the portion of the second signal that is interfered by the first signal.

35. The method of claim 26, further comprising, at the second receiver, suppressing interference from the first signal across a plurality of receive antennas using a time-domain whitening filter.

36. The method of claim 26, further comprising, at the second receiver, suppressing interference by correlating interference from the first signal across a plurality of receive antennas and tones.

37. The method of claim 26, further comprising, at the second receiver, suppressing interference from the first signal using tone-by-tone whitening and by disregarding cross-tone interference.

38. The method of claim 26, further comprising, at the second receiver, suppressing interference from the first signal using multiple-tone whitening, wherein a number of tones whitened together is predetermined or adaptively selected.

39. The method of claim 25, wherein:
the first communication protocol includes a cellular protocol; and the second communication protocol includes a WiFi protocol.

40. The method of claim 39, further comprising:

processing, using the portion of the physical layer and the portion of the medium access control layer of the first receiver, without establishing a connection with a base station at a layer higher than the medium access control layer, (i) the first portion of the first signal and (ii) the second portion of the first signal, wherein the first portion and the second portion of the first signal exclude a data portion of the first signal.

41. The method of claim 40, wherein the first portion of the first signal includes information broadcast by the base station, the method further comprising:

suppressing, at the second receiver, interference in response to the first receiver demodulating the first portion of the first signal including information broadcast by the base station.

42. The method of claim 41, further comprising, at the second receiver, suppressing interference using (i) a whitening filter or (ii) a rejection filter.

43. The method of claim 40, wherein the first portion of the first signal includes information broadcast by the base station, the method further comprising:

canceling, at the second receiver, interference in response to the first receiver decoding the first portion of the first signal including information broadcast by the base station.

44. The method of claim 43, further comprising:

at the first receiver, re-encoding the first signal and providing the re-encoded first signal to the second receiver; and at the second receiver, canceling interference by subtracting the re-encoded first signal from the second signal.

45. The method of claim 40, wherein the second portion of the first signal includes information that is not addressed to the first receiver and that is un-decodable at the first receiver, the method further comprising:

suppressing, the second receiver, interference based on the second portion of the first signal in response to the first receiver demodulating the second portion of the first signal including information (i) not addressed to the first receiver and (ii) un-decodable at the first receiver.

46. The method of claim 40, wherein the second portion of the first signal includes information that is not addressed to the first receiver and that is decodable at the first receiver, the method further comprising:

at the second receiver, suppressing or canceling interference based on the second portion of the first signal in response to the first receiver decoding the second portion of the first signal including information (i) not addressed to the first receiver and (ii) decodable at the first receiver.

47. The method of claim 39, further comprising:

detecting, at the first receiver, energy of the first signal and determine, based on the detected energy, whether data is transmitted in the first signal; and at the second receiver, (i) suppressing interference in response the first receiver determining that data is transmitted in the first signal, and (ii) turning off interference suppression in response the first receiver determining that data is not transmitted in the first signal.

48. The method of claim 39, further comprising:

decoding, at the first receiver, the first signal in response (i) the first signal being not addressed to the first receiver and (ii) the first signal including information to assist the first receiver in decoding a data portion of the first signal; and canceling, at the second receiver, interference in response the first receiver decoding the data portion of the first signal.

* * * * *